United States Patent
Tomioka

(10) Patent No.: US 7,364,225 B2
(45) Date of Patent: Apr. 29, 2008

(54) VEHICLE BODY STRUCTURE

(75) Inventor: Toshinori Tomioka, Fuchu-cho (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 11/634,149

(22) Filed: Dec. 6, 2006

(65) Prior Publication Data

US 2007/0138837 A1    Jun. 21, 2007

(30) Foreign Application Priority Data

Dec. 15, 2005 (JP) ............................. 2005-361876
Dec. 26, 2005 (JP) ............................. 2005-372128
Mar. 29, 2006 (JP) ............................. 2006-091002

(51) Int. Cl.
   B62D 25/08    (2006.01)
(52) U.S. Cl. ...................... 296/203.04; 296/193.05
(58) Field of Classification Search ................
       296/203.03–203.04, 193.05–193.08, 29–30
   See application file for complete search history.

(56) References Cited

U.S. PATENT DOCUMENTS

| | | | | |
|---|---|---|---|---|
| 1,797,917 A | * | 3/1931 | Ledwinka | 296/193.06 |
| 4,875,733 A | * | 10/1989 | Chado et al. | 296/203.04 |
| 4,938,525 A | * | 7/1990 | Yamauchi | 296/203.03 |
| 4,973,103 A | * | 11/1990 | Imajyo et al. | 296/203.04 |
| 5,027,570 A | * | 7/1991 | Mitchell et al. | 52/210 |
| 5,228,741 A | * | 7/1993 | Ide | 296/187.11 |
| 6,073,993 A | * | 6/2000 | Iwatsuki et al. | 296/203.04 |
| 6,086,100 A | * | 7/2000 | Corporon et al. | 280/808 |
| 6,254,174 B1 | * | 7/2001 | Wee | 296/203.04 |
| 6,824,204 B2 | * | 11/2004 | Gabbianelli et al. | 296/205 |

FOREIGN PATENT DOCUMENTS

| | | |
|---|---|---|
| JP | 05077767 A * | 3/1993 |
| JP | 11-348826 | 12/1999 |
| JP | 2002-205665 | 7/2002 |
| JP | 2002-331959 | 11/2002 |
| JP | 2005-199855 | 7/2005 |

* cited by examiner

Primary Examiner—Dennis H. Pedder
Assistant Examiner—Mike Hernandez

(57) ABSTRACT

Disclosed is a vehicle body structure, which comprises a body sidewall which forms a side portion of a vehicle body, a wheel house formed on a lower side of the body sidewall and provided with a mounting portion on which a rear suspension system mounts, a side pillar reinforcing member arranged in a side pillar located above the wheel house to extend in a vertical direction of the vehicle body so as to reinforce the side pillar, a rear pillar reinforcing member arranged in a rear pillar located rearward of the wheel house to extend in the vertical direction of the vehicle body to reinforce the rear pillar, a first connection member connecting the side pillar reinforcing member and a lower end of the wheel house, a second connection member connecting the rear pillar reinforcing member and a vicinity of the mounting portion of the wheel house, and a third connection member connecting the side pillar reinforcing member and the rear pillar reinforcing member, in a position above the wheel house.

26 Claims, 31 Drawing Sheets

FRONTWARD ←

VEHICLE BODY STRUCTURE

BACKGROUND OF THE INVENTION

1. Field of the Invention

The present invention relates to a body structure of a vehicle, such as an automobile, and more specifically to a vehicle body structure in a region around a wheel house for a rear wheel and rearward of the wheel house.

2. Description of the Related Art

As is commonly known, in a vehicle, such as an automobile, a sidewall of a vehicle body (hereinafter referred to as "body sidewall") is formed with a wheel house in a position where a rear wheel is disposed, and a rear suspension system is mounted to the wheel house. Thus, during running of the vehicle, load along an approximately upright direction would be repeatedly transmitted from the rear suspension system to the wheel house.

In the vehicle, it is desired to allow the load transmitted from the rear suspension system to the wheel house to be efficiently distributed over the body sidewall for purposes such as reduction in deformation of the vehicle body and improvement in steering stability. For example, Japanese Patent Laid-Open Publication No. 2002-331959 discloses an automobile rear body structure intended to allow upward thrust load from a rear suspension system to be effectively distributed by a simplified structure.

Meanwhile, in a specific type of vehicle, such as a minivan or station wagon, a rear wall of a vehicle body is formed with a large opening which is covered with and a lift gate is arranged to cover the opening. In this type of vehicle, deformation of the vehicle body is more likely to occur in a body sidewall in a rear portion of the vehicle body, and it is therefore desired to further improve the torsional rigidity of the body sidewall.

During running, this type of vehicle also undergoes load repeatedly transmitted from a rear suspension system to a wheel house along an approximately upright direction. Thus, in the region of the body sidewall around the wheel house formed in the rear portion of the vehicle body and rearward of the wheel house, how to allow the load imposed on the wheel house to be transmitted to the body sidewall so as to improve the torsional rigidity of the body sidewall becomes important.

SUMMARY OF THE INVENTION

In view of the above technical problems, it is an object of the present invention to provide a vehicle body structure capable of improving the torsional rigidity of a body sidewall in a rear portion of a vehicle body.

It is another object of the present invention to allow a vehicle body structure having a mount portion for a part of a rear suspension system at a position offset from a top region of a wheel house, to reliably support load applied from the rear suspension system and distributedly transmit the load so as to enhance supporting rigidity to achieve enhanced rigidity of the mounting portion for the rear suspension system.

It is yet another object of the present invention to allow a vehicle body structure with a wheel house to enhance the rigidity of a lower edge of the wheel house and the torsional rigidity of a vehicle body so as to improve response of the vehicle body during a steering operation.

In order to achieve the above objects, the present invention provides a vehicle body structure which comprises a body sidewall which forms a side portion of a vehicle body, a wheel house formed on a lower side of the body sidewall and provided with a mounting portion on which a rear suspension system mounts, a side pillar reinforcing member arranged in a side pillar located above the wheel house to extend in a vertical direction of the vehicle body to reinforce the side pillar, a rear pillar reinforcing member arranged in a rear pillar located rearward of the wheel house to extend in the vertical direction of the vehicle body so as to reinforce the rear pillar, a first connection member connecting the side pillar reinforcing member and a lower end of the wheel house, a second connection member connecting the rear pillar reinforcing member and a vicinity of the mounting portion of the wheel house, and a third connection member connecting the side pillar reinforcing member and the rear pillar reinforcing member, in a position above the wheel house. Thus, in the present invention, a region of the body sidewall located above the wheel house and rearward thereof can be reinforced to improve torsional rigidity of the body sidewall. In the present invention, the term "a part of a rear suspension system" includes a damper, a suspension link and a coil spring. Particularly, in a damper, a load is input in not only the vertical direction but also the longitudinal and lateral directions of the vehicle body, because the mounting portion is set at a position offset from a bumping position of a rear wheel. In the present invention, such input load in various directions can be further effectively distributed to enhance the supporting rigidity for the mounting portion.

These and other objects, features and advantages of the invention will become apparent upon reading the following detailed description along with the accompanying drawings.

DETAILED DESCRIPTION OF THE PREFERRED EMBODIMENTS OF THE INVENTION

First Embodiment

With reference to FIGS. 1 to 24, a first embodiment of the present invention will be described. While the following description will be made about only a right side portion of a vehicle body 1 as shown in FIGS. 1 to 24, a left side portion of the vehicle body 1 has the same structure.

Figure 1:
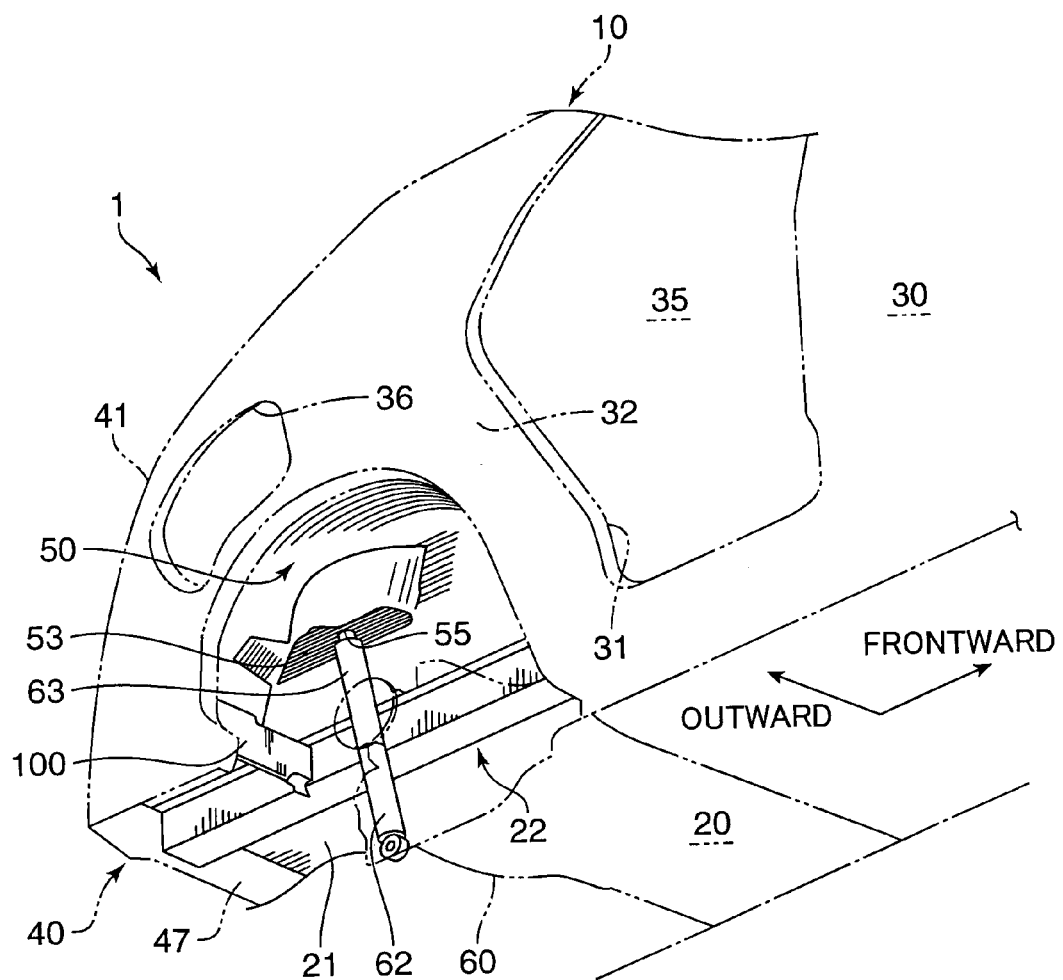
FIG. 1 is a perspective look up view showing a hollow part of a wheel house in a rear portion of a vehicle body according to a first embodiment of the present invention, as viewed obliquely upward from a frontward bottom position.
Figure 2:
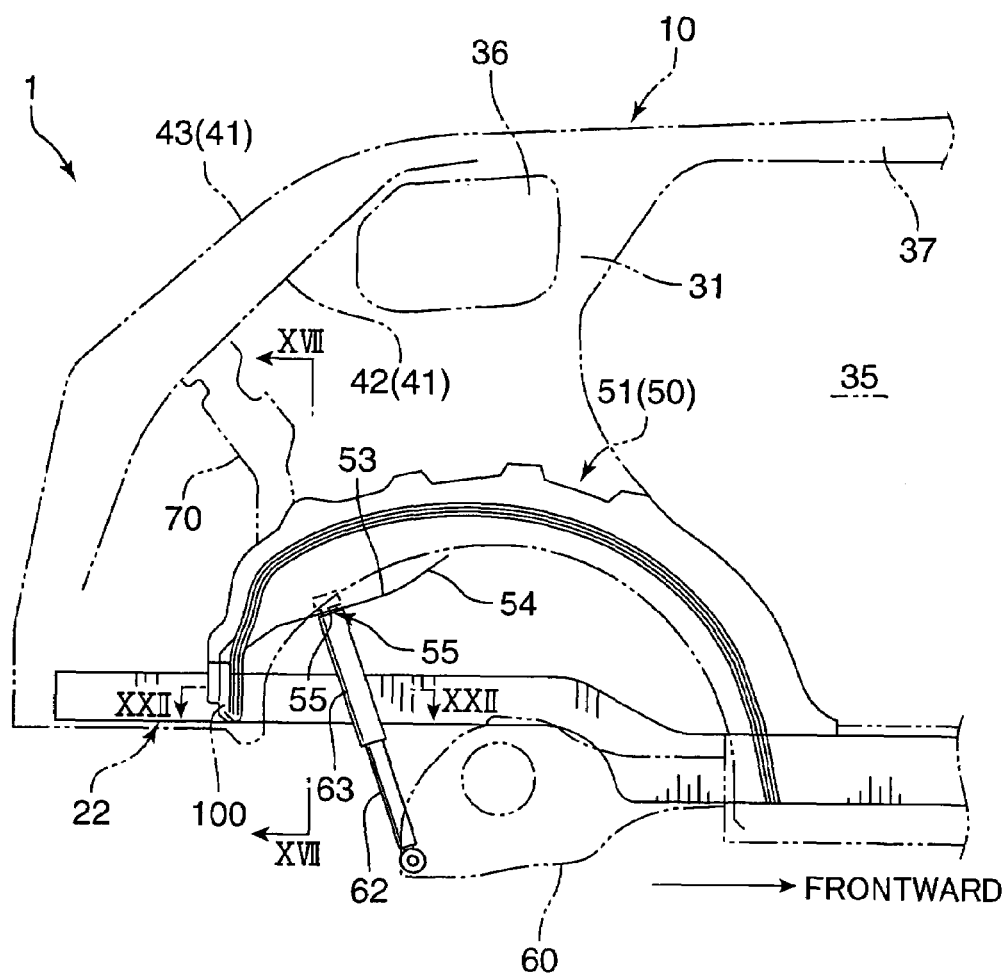
FIG. 2 is a side view of a vicinity of the wheel house in the rear portion of the vehicle body in FIG. 1, wherein a side outer panel is transparently illustrated.
Figure 3:
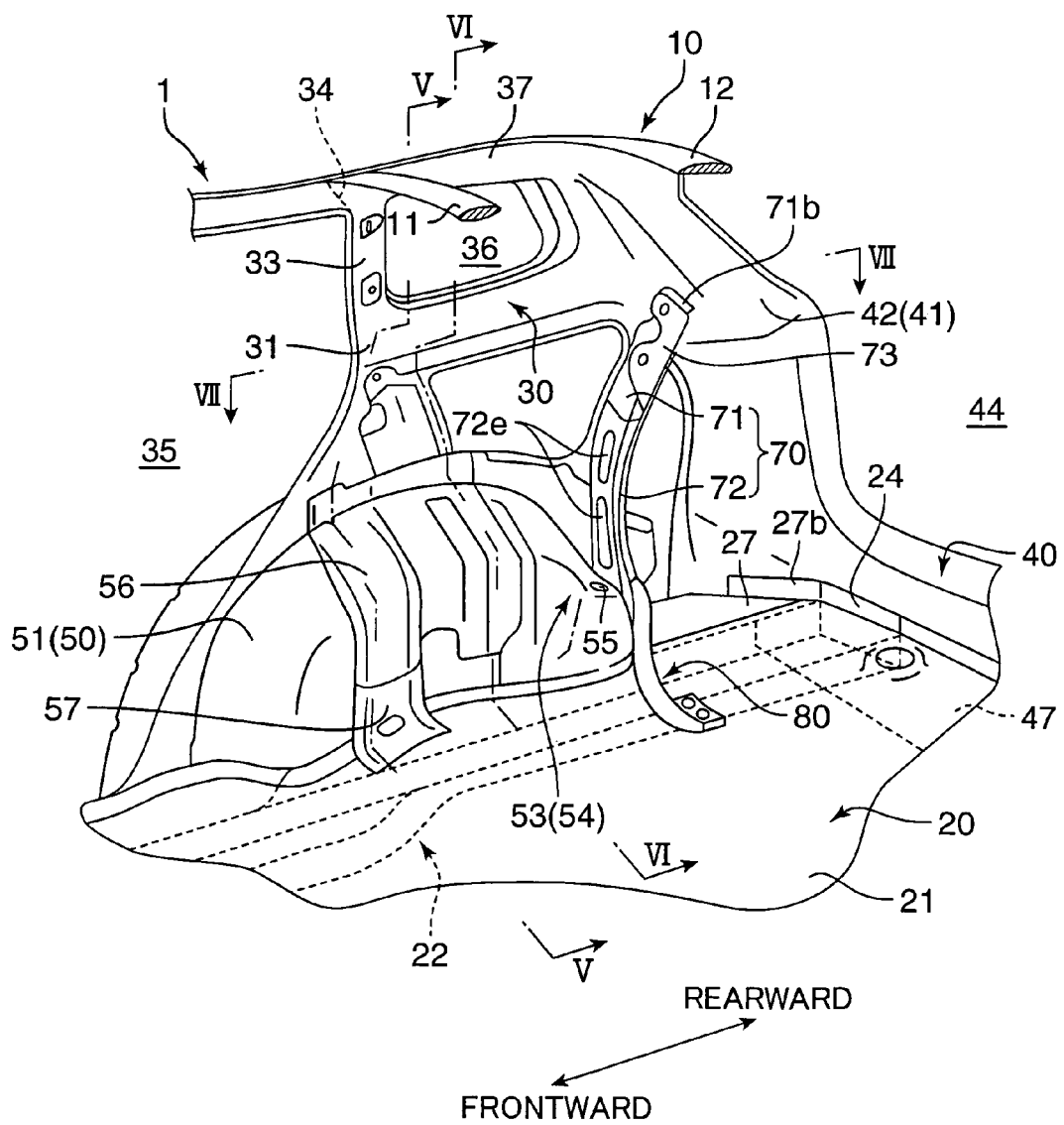
FIG. 3 is a perspective view schematically showing the rear potion of the vehicle body in FIG. 1.

Referring to FIGS. 1 to 3, the vehicle body 1 is designed for a body of an automobile, such as a minivan or station wagon. The vehicle body 1 comprises a roof 10 which forms a ceiling surface of a vehicle interior, a body floor 20 which forms a floor surface of the vehicle interior, a body sidewall 30 which extends between the roof 10 and the body floor 20 to form a side surface of the vehicle body, and a wheel house 50 formed between the body floor 20 and the body sidewall 30 to receive therein a rear wheel (not shown).

The roof 10 includes two roof reinforcing members 11, 12 disposed parallel to each other in a frontward, rearward, or longitudinal direction of the vehicle body to extend in a width or lateral direction of the vehicle body (see FIG. 3). The roof reinforcing member 11 disposed on a frontward side of the vehicle body 1 extends laterally from an upper side of a side pillar 33 of the body sidewall 30. The roof reinforcing member 12 disposed on a rearward side of the vehicle body 1 extends laterally from an upper side of a rear pillar 41 partially included in the body sidewall 30. Thus, in this embodiment, load transmitted to the side pillar 33 and the rear pillar 41 can be distributed in the transmissions to the roof reinforcing members 11, 12.

The body floor 20 includes a main floor panel 21. A rear seat (not shown) is placed on the main floor panel 21. A rear side frame 22 as a frame member is fixed to a bottom surface of the main floor panel 21.

The rear side frame 22 is formed as a pair, in a rear portion of the vehicle body 1 (only the right rear side frame is shown in FIG. 1), and arranged to extend in the longitudinal direction of the vehicle body 1. The rear side frame 22 makes up a major skeleton of the vehicle body structure to enhance the rigidity of the rear portion of the vehicle body 1. The rear side frame 22 is formed of a member which has an inverse hat shape in sectional view extending in the longitudinal direction of the vehicle body 1. The rear side frame 22 has a rear edge formed as a flange 24 extending upward from the main floor panel 21. The flange 24 is joined to a part of the rear pillar 41 included in a body rear wall 40 of the vehicle body 1, and further joined to a rear pillar reinforcing member 43 which reinforces the rear pillar 41. A coil spring 25 is disposed below the main floor panel 21 (see FIG. 9). The coil spring 25 is supported by the rear side frame 22 through a spring seat 26 fixed to the bottom surface of the rear side frame 22 (see FIG. 9).

Figure 4:
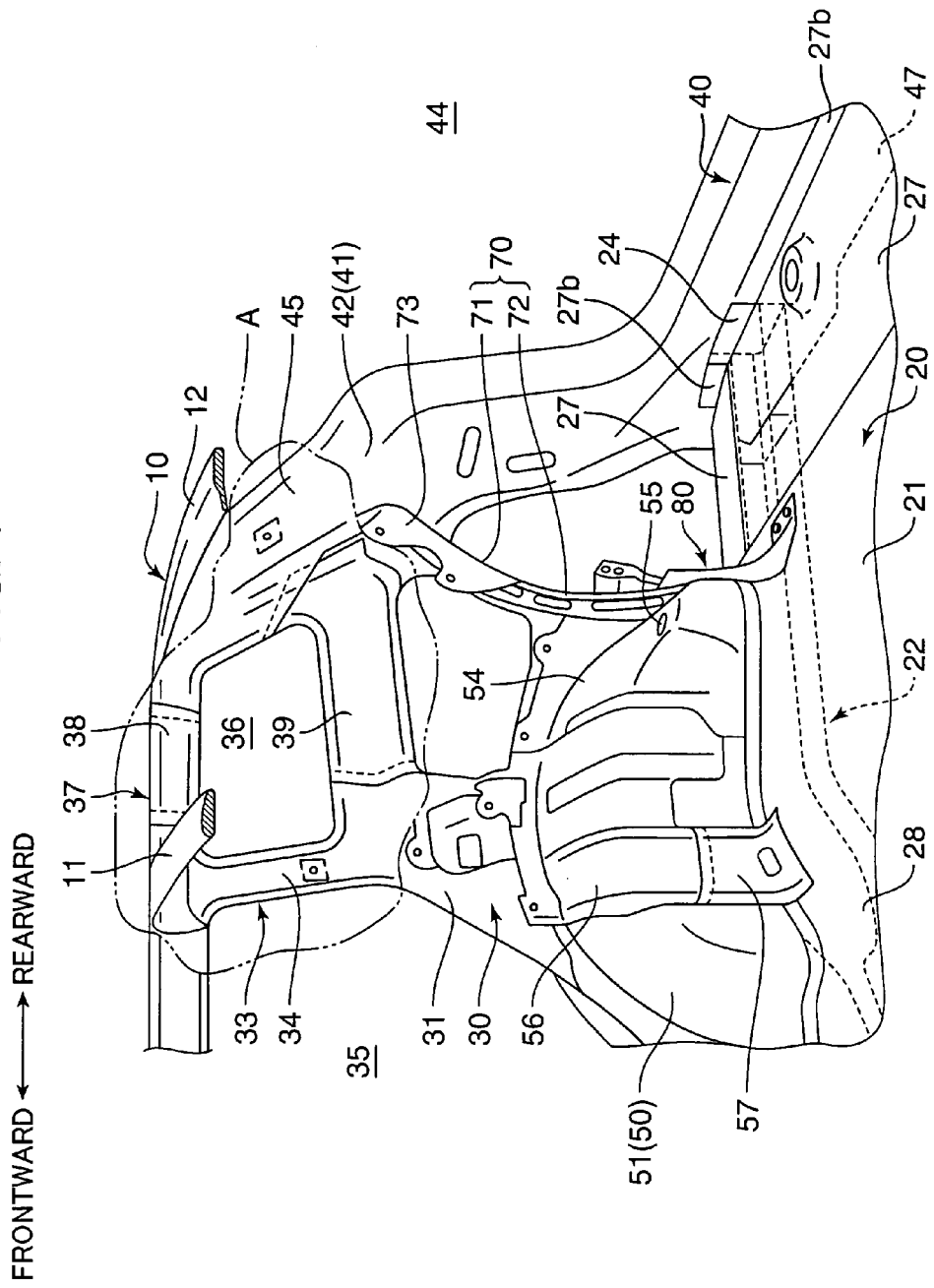
FIG. 4 is an explanatory perspective view showing the rear potion of the vehicle body in FIG. 1, wherein an inner panel is partially removed.
Figure 8:
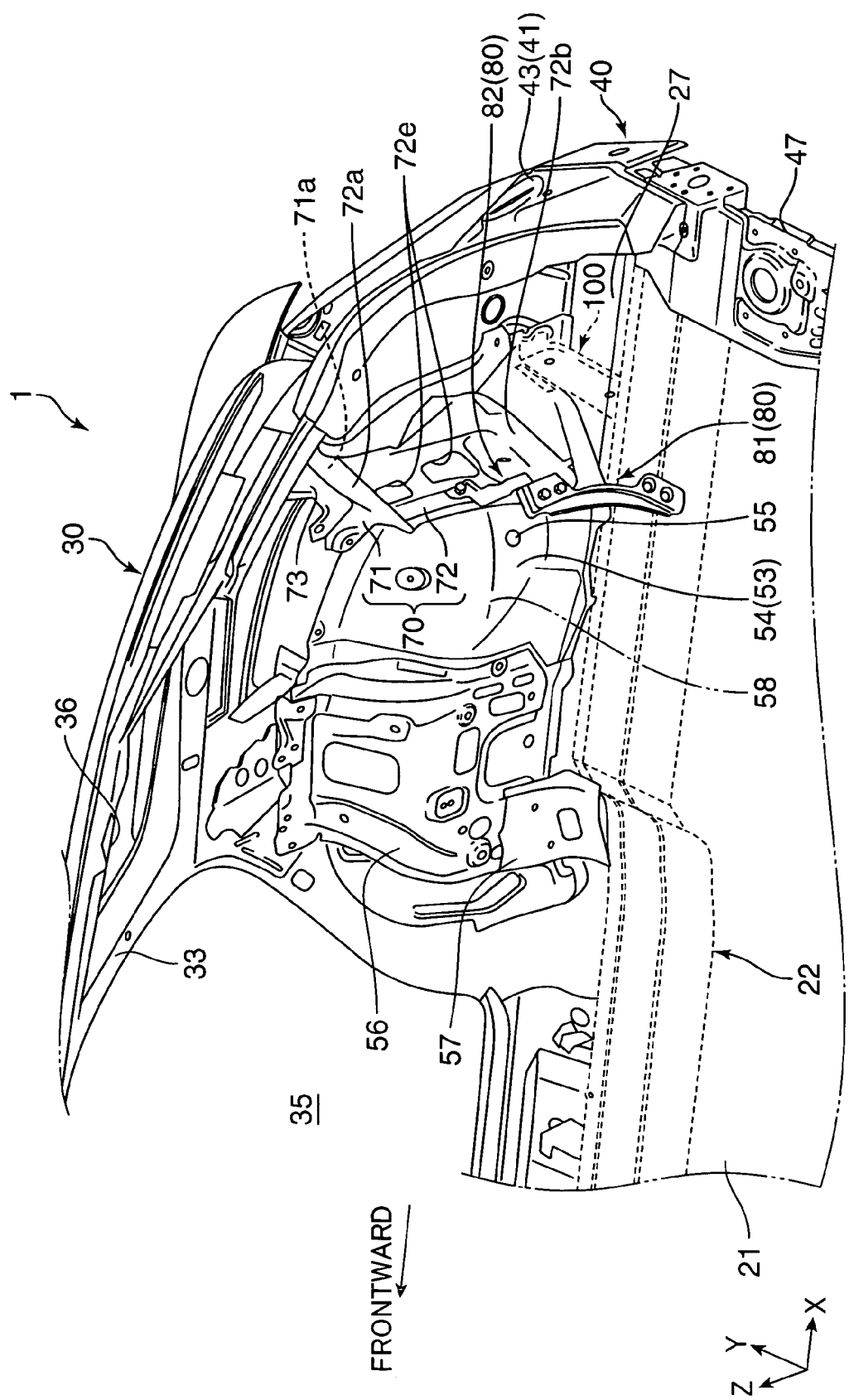
FIG. 8 is a perspective view showing the rear potion of the vehicle body in FIG. 1, as viewed from a vicinity of a tailgate opening.
Figure 23:
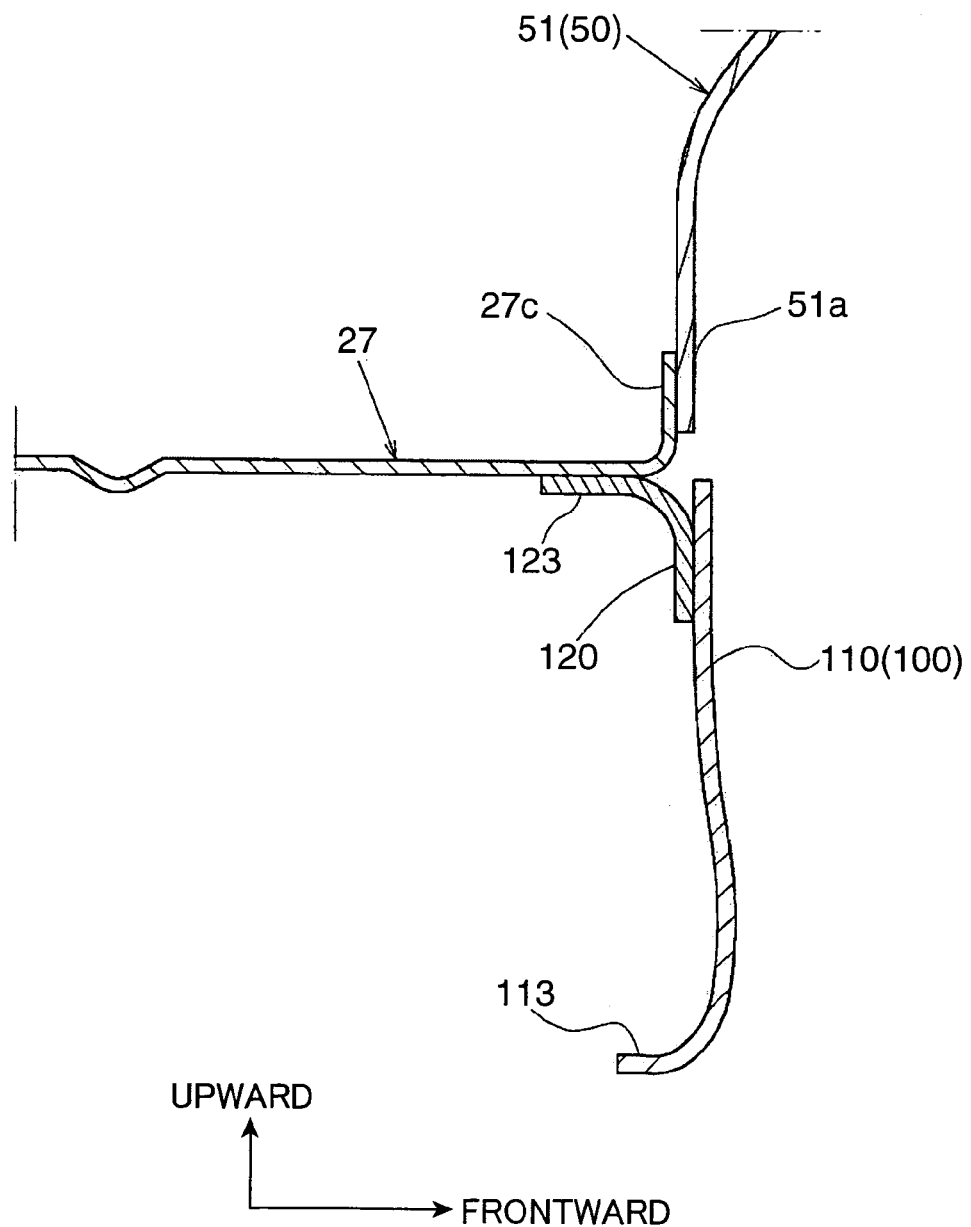
FIG. 23 is a sectional view taken along the line XXIII-XXIII in FIG. 17.

The body floor 20 further includes a side floor panel 27 (see FIGS. 3, 4 and 8). The side floor panel 27 makes up a part of the body floor 20 which is located rearward of a wheel house inner 51. The side floor panel 27 has a front edge partly formed as a front-downward junction flange 27a bent to extend downward. The side floor panel 27 also has an outward edge formed as an outward junction flange 27b bent to extend downward. Further, as shown in FIG. 23, the front edge of the side floor panel 27 is partly formed as a front-upward junction flange 27c bent to extend upward. This front-upward junction flange 27c is formed by bending the front edge portion in a direction opposite to that of the front-downward junction flange 27a.

The body sidewall 30 makes up a sidewall of the vehicle body 1. The body sidewall 30 is formed by combining an inner panel 31 defining an inner surface thereof, and an outer panel 32 defining an outer surface thereof (see FIGS. 5 and 6). In FIG. 4, the inner panel 31 is partially removed in an area surrounded by the two-dot chain line A.

Figure 5:
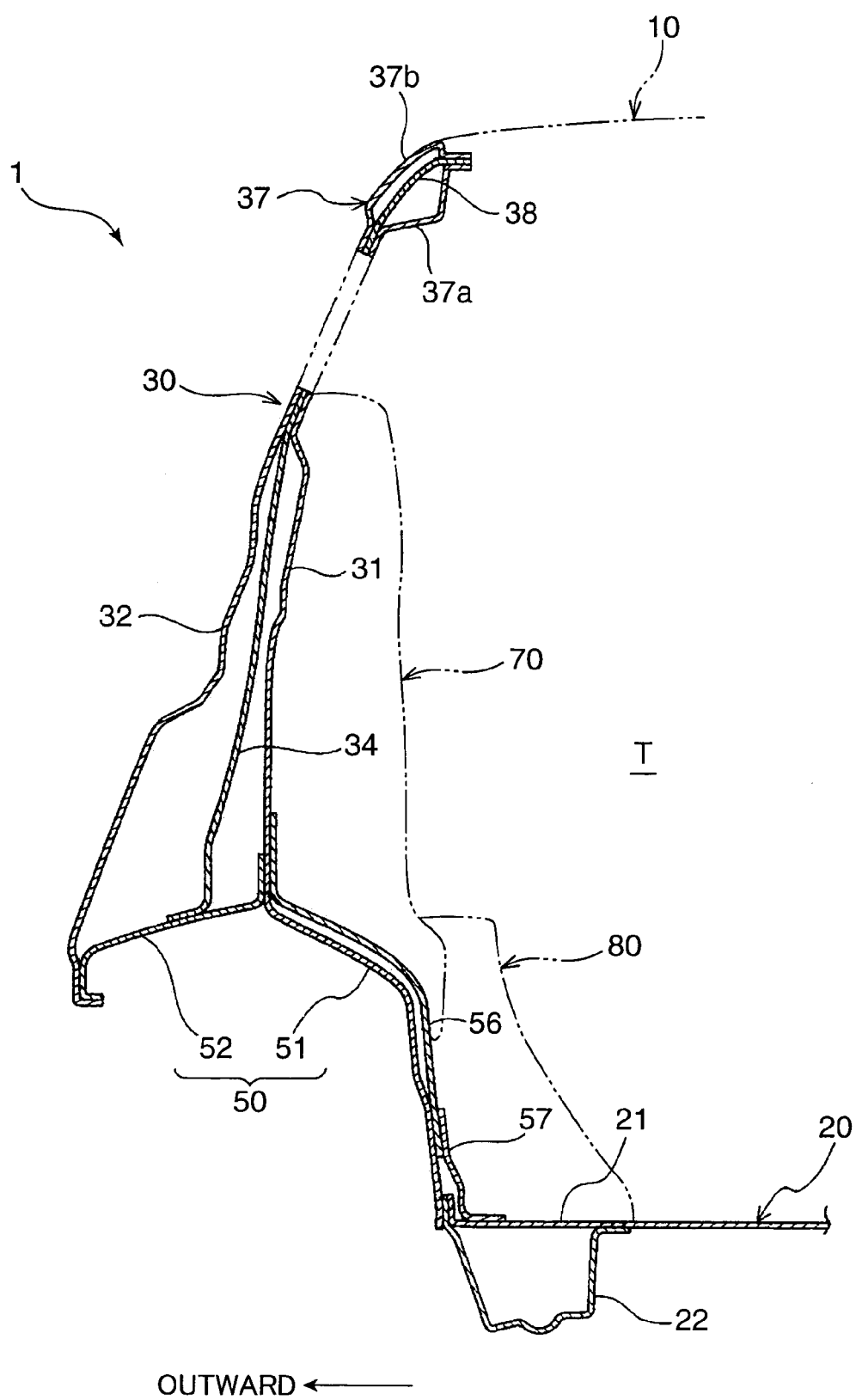
FIG. 5 is an explanatory sectional view taken along the line V-V in FIG. 3.
Figure 6:
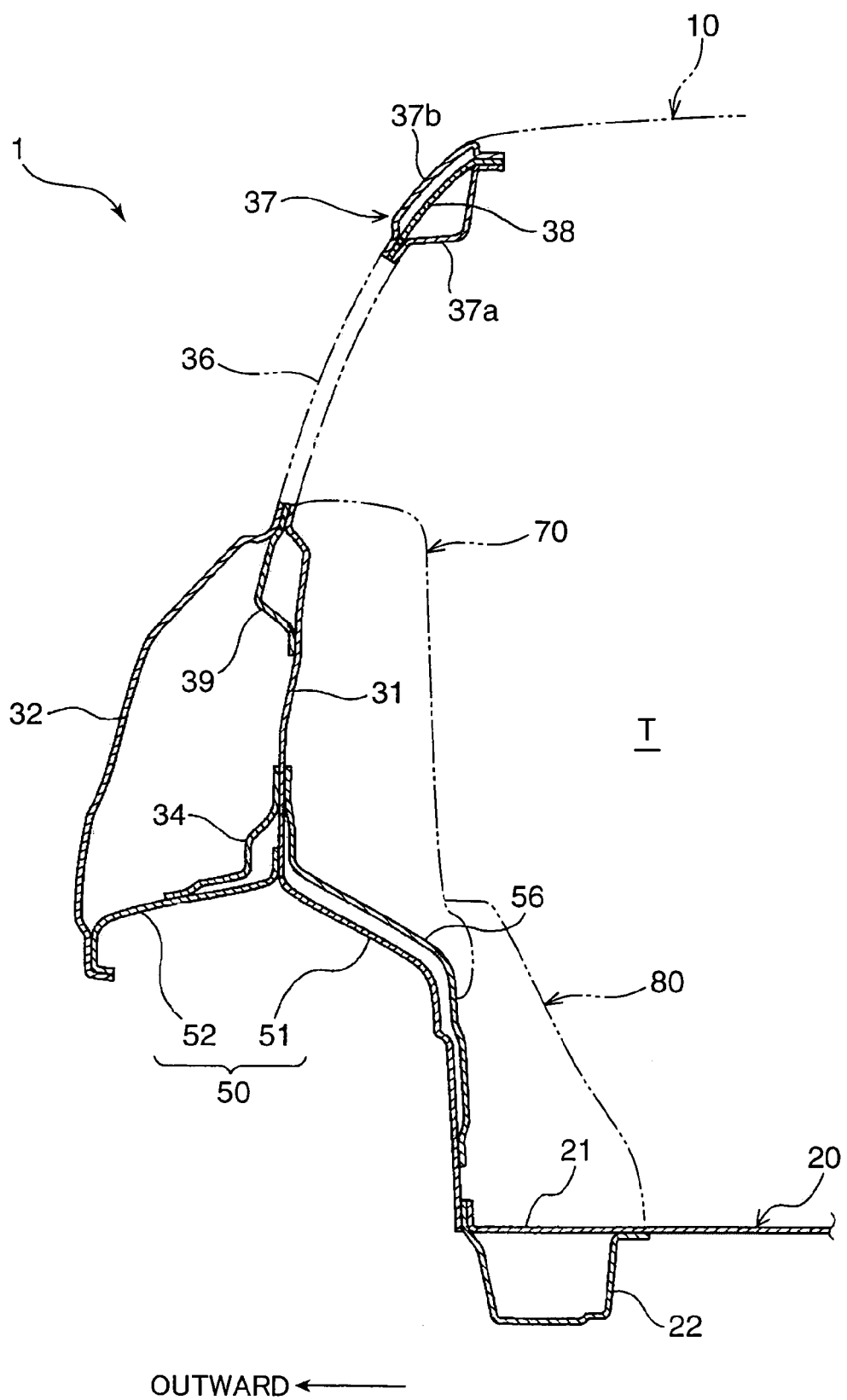
FIG. 6 is an explanatory sectional view taken along the line VI-VI in FIG. 3.

Referring to FIGS. 4 to 6, the side pillar 33 is arranged in a frontward region of the body sidewall 30.

The side pillar 33 is provided with a side pillar reinforcing member 34 which extends in a vertical direction (i.e., height or upward/downward direction) of the vehicle body and reinforces the side pillar 33. The roof reinforcing member 11 is integrated with the side pillar 33 through the side pillar reinforcing member 34.

A region of the body sidewall 30 located frontward of the side pillar 33 is formed with a rear side door opening 35 which is provided with a rear side door (not shown). Further, a region of the body sidewall 30 located rearward of the rear side door opening 35 is formed with a rear quarter window opening 36 which is provided with a rear quarter window (not shown). The rear quarter window opening 36 has an upper peripheral edge defined by a roof side rail 37 continuous with the roof 10. The roof side rail 37 comprises a roof side inner panel 37a included in the inner panel 31 and a roof side outer panel 37b included in a roof side outer panel 32. Further, a roof side rail reinforcing member 38, as a fourth connection member, is provided between the roof side inner and outer panels 37a and 37b.

The roof side rail reinforcing member 38 has a front edge superimposed on and joined to the side pillar reinforcing member 34. The roof side rail reinforcing member 38 also has a rear edge superimposed on and joined to the rear pillar reinforcing member 45. Thus, the roof side rail reinforcing member 38 connects respective upper ends of the side pillar reinforcing member 34 and the rear pillar reinforcing member 45.

A belt line reinforcing member 39 is fixed to a lower peripheral edge of the rear quarter window opening 36 to extend in the longitudinal direction of the vehicle body. As shown in FIG. 6, the belt line reinforcing member 39 has an upper edge flange-connected to both the inner panel 31 and the outer panel 32, and a lower edge joined to a laterally outward surface of the inner panel 31. The belt line reinforcing member 39 has a front edge superimposed on and joined to the side pillar reinforcing member 34.

Figure 7:
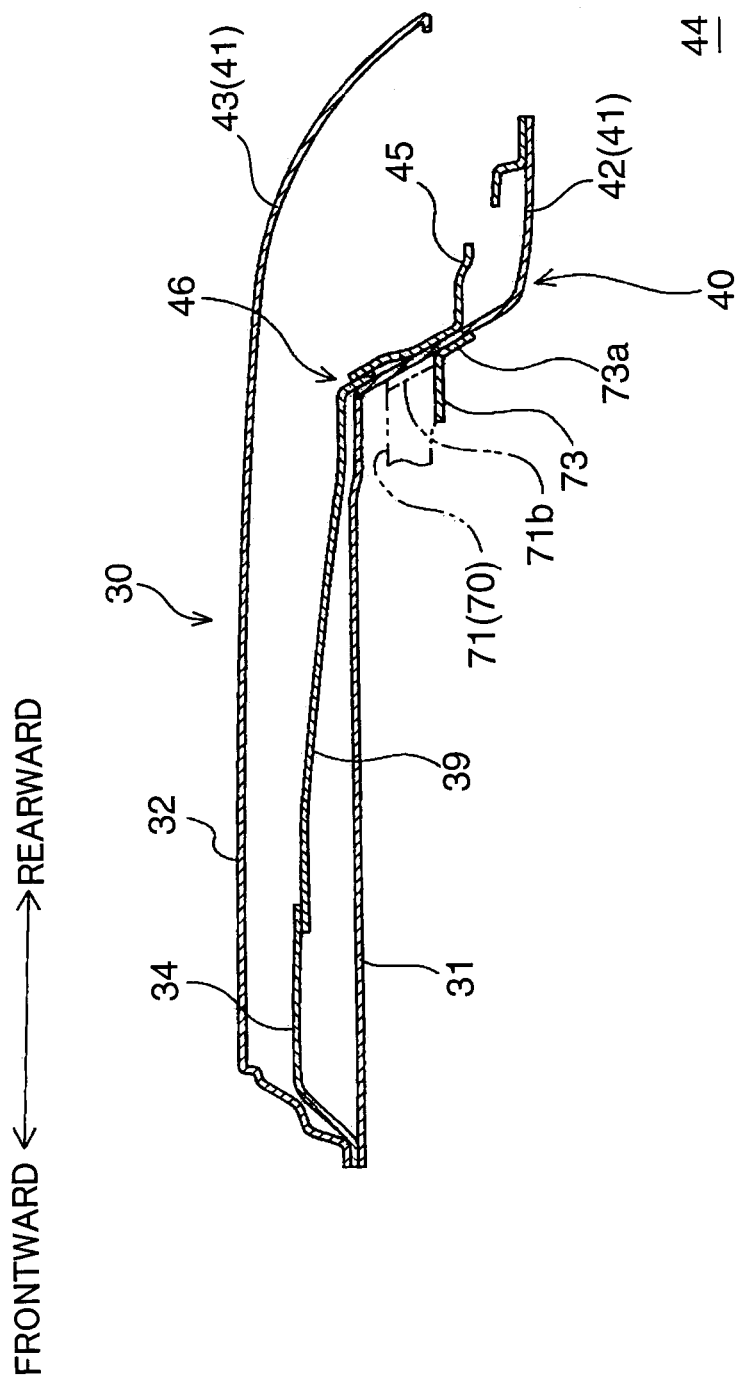
FIG. 7 is an explanatory sectional view taken along the line VII-VII in FIG. 3.

Referring to FIG. 7, the body rear wall 40 includes the rear pillar 41 which is continuous with the body sidewall 30. The rear pillar 41 has an upper portion inclined in the frontward direction of the vehicle body 1. The rear pillar 41 comprises a pillar inner panel 42 continuous with the inner panel 31 and a pillar outer panel 43 continuous with the outer panel 32. The pillar inner panel 42 and the pillar outer panel 43 are joined together through their flanges to define a closed section therebetween. A region of the body rear wall 40 on the laterally inward side of the rear pillar 41 is formed with a lift gate opening 44 adapted to be covered by a lift gate or tailgate (not shown). The pillar inner 42 of the rear pillar 41 is reinforced by the rear pillar reinforcing member 45 through which the aforementioned roof reinforcing member 12 is connected to the rear pillar 41.

The belt line reinforcing member 39 has a rear edge joined to an outer surface of the inner panel 31 constituting the rear pillar 41. The belt line reinforcing member 39 is also joined to the rear pillar reinforcing member 45. Thus, the belt line reinforcing member 39, the side pillar reinforcing member 34 and the rear pillar reinforcing member 45 are integrally jointed together to form a joint portion 46 in a position above the wheel house 50. Further, a cross member 47 is arranged in a bottom region of a rear end of a cargo compartment T (see FIG. 8).

The wheel house 50 comprises the wheel house inner 51 which expands laterally inward, and a wheel house outer 52 which expands laterally outward. More specifically, the wheel house inner 51 expands laterally inward direction of the vehicle body 1 to receive therein a rear wheel and a rear suspension system 60. The wheel house inner 51 is integrally formed with the inner panel 31 to extend up to the body floor 20.

Although not illustrated, in this embodiment, the wheel house inner 51 has a laterally inward edge joined to the rear side frame 22 to ensure the rigidity of the wheel house.

As shown in FIG. 5, the wheel house outer 52 has a laterally inward edge joined to the wheel house inner 51, and a laterally outward edge joined to the outer panel 32. Further, the side pillar reinforcing member 34 is joined to a laterally approximately central portion of the wheel house outer 52.

Referring to FIG. 2, the wheel house 50 has a rearward region formed with a mounting portion 53 on which mounts a rear suspension damper 61 as a part of the rear suspension system 60. The rear suspension damper 61 consists of a cylinder-type shock absorber mechanism adapted to cushion shock from the rear wheel based on flow resistance of enclosed oil, and fundamentally, comprises a cylinder 62 fixed to the side of the rear wheel and a piston 63 fixed to the side of the vehicle body. Although not specifically illustrated, the rear suspension system 60 is formed as a multi-link suspension adapted to support the rear wheel by a plurality of links.

The mounting portion 53 is obtained by forming a downward-depressed concave portion 54 having a flat bottom, in a part of the rearward region of the wheel house inner 51, and then form a hole 55 in a central position of the concave portion 54 to allow an upper end of the rear suspension damper 61 to be fixedly inserted thereinto (see FIG. 3). Thus, the load along an approximately upright direction will be transmitted from the rear suspension damper 61 of the rear suspension system 60 to the wheel house 50 through the mounting portion 53.

As above, the mounting portion 53 is offset from a top region of the wheel house inner 51 in the rearward direction of the vehicle body 1. The reason is that an upward protrusion due to the rear suspension damper 61 is reduced in a top region and a frontward region of the wheel house inner 51 to maximize a space of a passenger compartment so as to increase ride comfort.

However, due to the mounting portion 53 located on the rearward side of the vehicle body 1, the load would be transmitted from the rear suspension damper 61 to the wheel house inner 51 with an angle inclined in the rearward direction of the vehicle body 1. That is, the transmitted load has a different value from that in the conventional structure.

Thus, in the first embodiment, a wheel house connection gusset 70 is disposed between a vicinity of the mounting portion 53 of the wheel house 51 and the rear pillar 41 inclined in the frontward direction of the vehicle body 1, to extend in the vertical direction of the vehicle body 1 and with an angle inclined in the rearward direction of the vehicle body 1, so as to allow the transmit loads apply to the mounting portion 53 to be transmitted to the rear pillar 41 in the body sidewall 30.

In the first embodiment, a floor gusset 80 is further disposed between a lower portion of the wheel house connection gusset 70 and the main floor panel 21, to extend laterally inward, so that the load to be transmitted to the wheel house connection gusset 70 is partially transmitted to the main floor panel 21 to facilitate distribution of the transmit loads apply to the mounting portion 53.

Referring to FIGS. 3 to 6, a side brace 56 is fixed onto a top surface of the wheel house inner 51 to extend in the vertical direction of the vehicle body 1 suitably along the wheel house inner 51. The side brace 56 has an upper end joined to the inner panel 31, and a lower end connected to the main floor panel 21 through a brace bracket 57.

The side brace 56 may be formed to extend up to a lower edge of the wheel house 50, and fixed thereto. Alternatively, the side brace 56 may be formed to extend up to the main floor panel 21, and joined thereto.

In a position illustrated in FIG. 5, the upper end of the side brace 56 is joined to the inner panel 31, and further joined to the side pillar reinforcing member 34 through the inner panel 31. In this position, the upper end of the side pillar reinforcing member 34 is joined to the inner panel 31, and the lower end of the side pillar reinforcing member 34 is joined to the wheel house outer 52.

A wheel house gusset 58 is arranged rearward of the side brace 56 to extend approximately along the wheel house inner 51. The wheel house gusset 58 is formed and arranged to cover over approximately the entire rearward region of the wheel house 50 on the side of the vehicle interior. The wheel house gusset 58 may be integrally formed with the side brace 56.

Referring to FIGS. 2 to 4, 8 to 10 and 17, in the first embodiment, the wheel house connection gusset 70 and the floor gusset 80 are arranged on the side of the vehicle interior above the main floor panel 21 to allow the transmit loads apply to the mounting portion 53 to distributedly transmitted to the rear pillar 41, the main floor panel 21 and others so as to relieve the transmit loads apply to the mounting portion 53 and reinforce the wheel house inner 51. In the first embodiment, the wheel house connection gusset 70 and the floor gusset 80 make up a second connection member.

Referring to FIGS. 8 to 11, the wheel house connection gusset 70 is formed by joining two components of an upper gusset 71 and the lower gusset 72 together through their junction flanges 71a, 72a. Among them, the upper gusset 71 has an upper junction flange 71b joined to the rear pillar 41 (illustrated only in FIG. 9), and firmly fixed to the rear pillar 41 through the upper junction flange 71b. As shown in FIG. 3, the upper gusset 71 is provided with a bracket member 73 (which is omitted in FIG. 9) in an upper portion thereof. The bracket member 73 is formed to extend between the upper gusset 71 and the rear pillar 41, and joined to a laterally inward edge of the upper gusset 71. Further, as shown in FIG. 7, the bracket member 73 has a flange portion 73a bent laterally inward along the rear pillar 41. The flange portion 73a is joined to both the inner panel 31 and the rear pillar reinforcing member 45.

In FIG. 7, the wheel house connection gusset 70 joined to the rear pillar 41 is indicated by the two-dot chain line. The upper gusset 71 of the wheel house connection gusset 70 is joined to the inner panel 31, in a vicinity of the joint portion 46 between the belt line reinforcing member 39 and the rear pillar reinforcing member 45, and joined to the rear pillar reinforcing member 45 through the inner panel 31.

The upper gusset 71 and the rear pillar reinforcing member 45 are jointed together at a laterally inward position relative to the joint portion 46 between the belt line reinforcing member 39 and the rear pillar reinforcing member 45. Thus, in the first embodiment, the side pillar reinforcing member 34, the side brace 56, the main floor panel 21, the wheel house connection gusset 70, the rear pillar reinforcing member 45 and the belt line reinforcing member 39 are connected together in a substantially quadrangular shape in side view. In addition, the side pillar reinforcing member 34, the belt line reinforcing member 39, the rear pillar reinforcing member 45 and the roof side rail reinforcing member 38 are connected together in a substantially quadrangular shape in side view. Further, in the above vehicle body 1, the main floor panel 21, the rear side frame 22, the rear pillar reinforcing member 45 and the wheel house connection gusset 70 are connected together in a substantially triangular shape in side view. While vehicle body structure according to the first embodiment is designed such that the upper gusset 71 of the wheel house connection gusset 70 is jointed to the rear pillar reinforcing member 45, the upper gusset 71 may be jointed to the joint portion 46.

Figure 15:
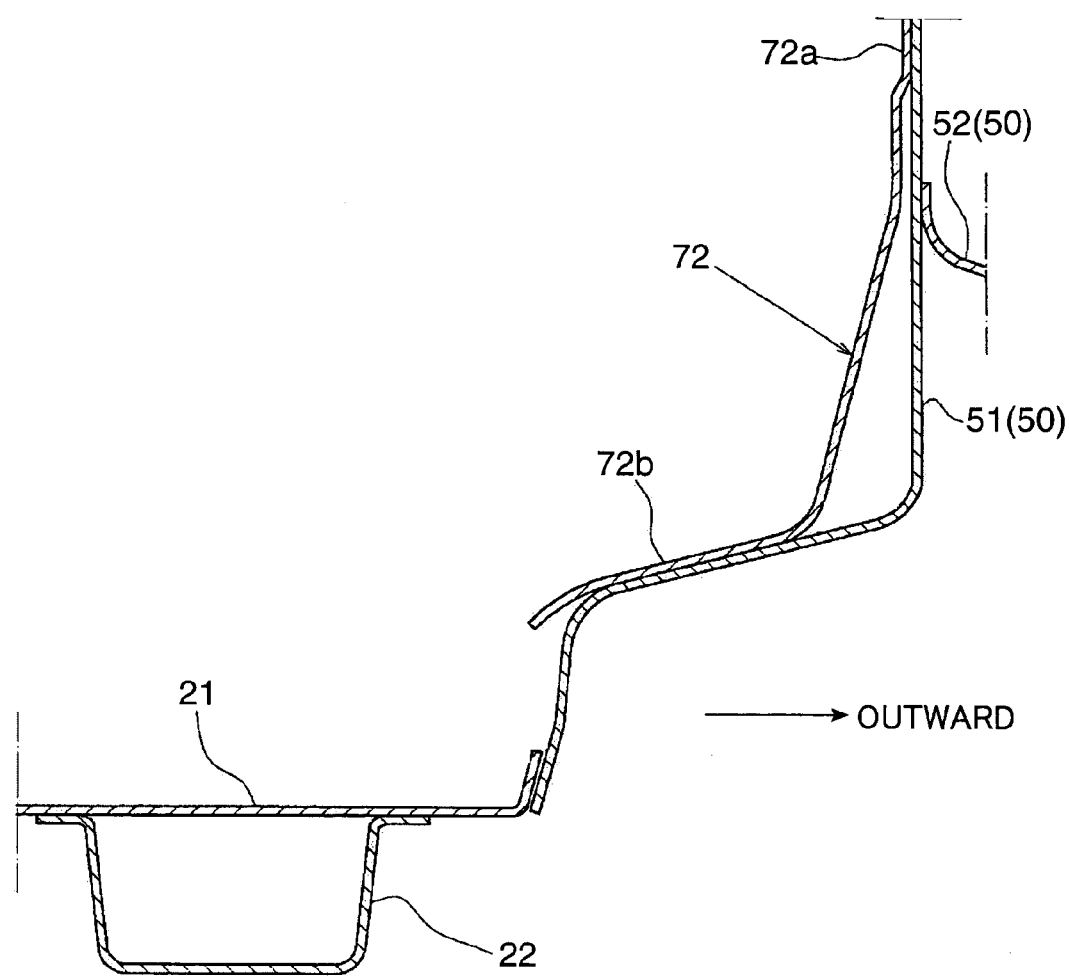
FIG. 15 is a sectional view taken along the line XVI-XVI in FIG. 9.

The lower gusset 72 is formed with a lower junction flange 72b, and firmly joined to a lower region of the wheel house 50 on the rearward side of the vehicle body 1 and in a vicinity of the mounting portion 50, through the lower junction flange 72b. As also shown in FIGS. 8 and 15, the lower junction flange 72b is joined onto an upward-facing surface of the wheel house inner 51 to extend over the entire upward-facing surface.

Figure 11:
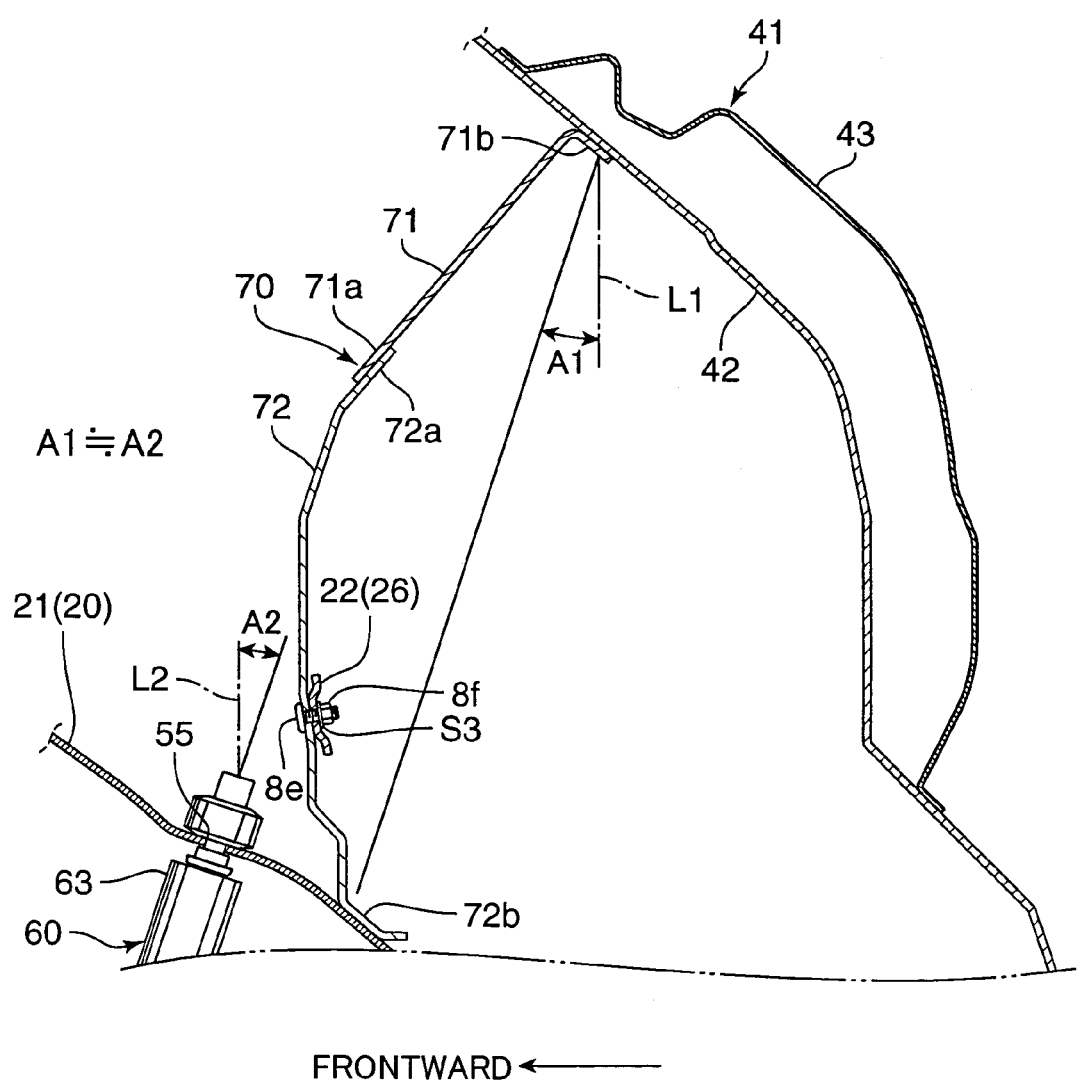
FIG. 11 is a sectional view taken along the line XI-XI in FIG. 10.

Referring to FIG. 11, the wheel house connection gusset 70 extends downward with an inclination while being curved. This inclination angle A1 of the wheel house connection gusset 70 with respect to a perpendicular line L1 is set at a value approximately equal to an inclination angle A2 of the rear suspension damper 61 with respect to a perpendicular line L2. This allows the wheel house connection gusset 70 to reliably transmit major transmit loads from the rear suspension damper 61 directly to the rear pillar 41.

Figure 9:
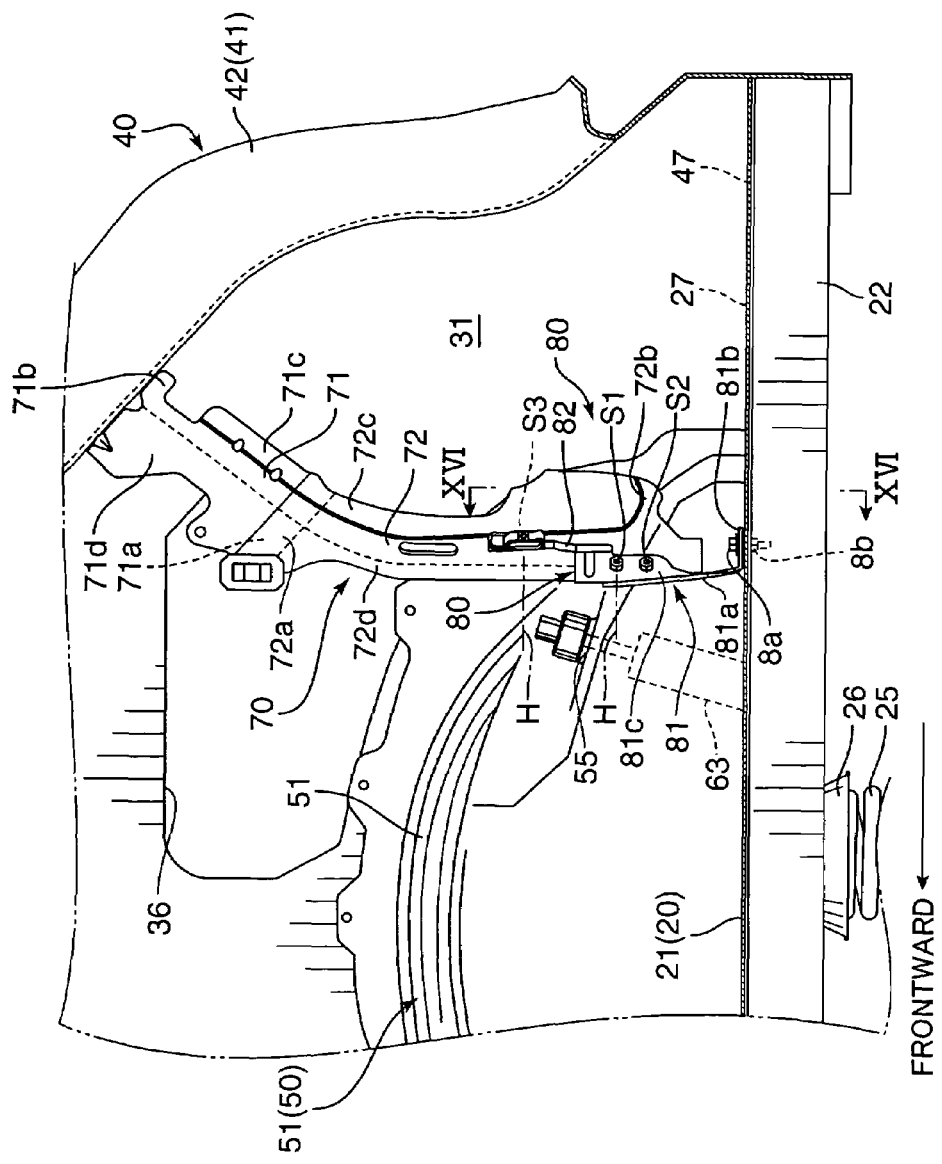
FIG. 9 is a side view showing a sidewall of a rear cargo compartment, as viewed laterally from the inside of the vehicle body.

As shown in FIG. 9, each of the upper and lower gussets 71, 72 has an outward edge formed with a junction flange (71c, 72c) which is joined to the body sidewall 30, and an inward edge formed with a bent flange (71d, 72d) which is bent to extend in the frontward direction of the vehicle body 1. This makes it possible to increase the rigidity of the wheel house connection gusset 70 in the vertical direction of the vehicle body so as to reliably transmit the upward transmit loads from the rear suspension damper 61 to the rear pillar 41. In addition, the wheel house connection gusset 70 is joined to the body sidewall 30 by the two portions, i.e., the junction flanges 71c, 72c, to allow the transmit loads from the rear suspension damper 61 to be additionally transmitted to the body sidewall 30. Thus, the transmit loads acting to the mounting portion 53 can effectively distributed. As shown in FIG. 8, a plurality of openings 72a are formed in an intermediate portion of the lower gusset 72 to facilitate reduction in weight of the lower gusset 72.

Figure 10:
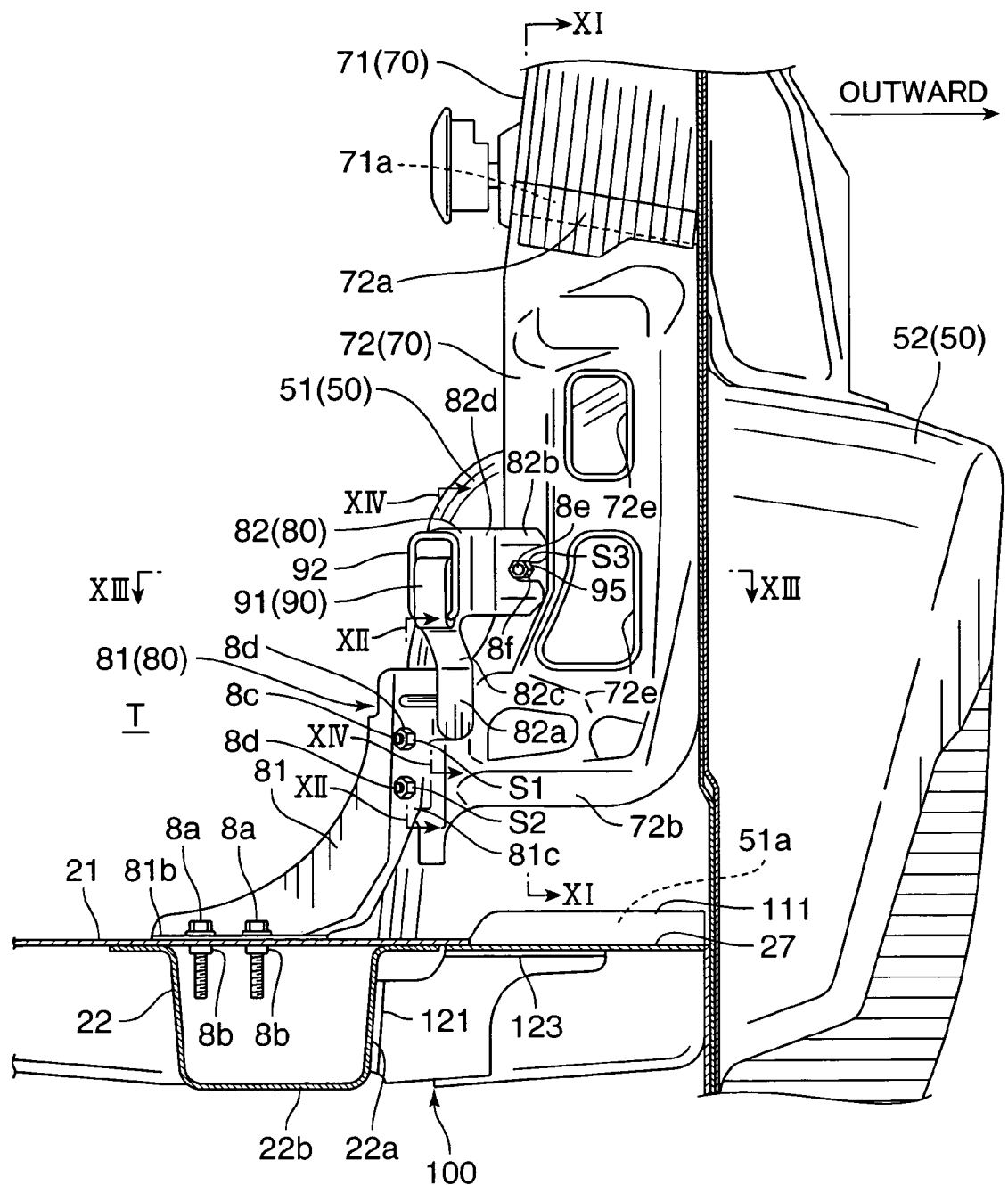
FIG. 10 is a rear view showing the sidewall of the rear cargo compartment, as viewed frontward from the side of a rear end of the vehicle body.

Referring to FIGS. 8 and 10, the floor gusset 80 is formed of two components consisting of an approximately arc-shaped main floor gusset 81 and an approximately L-shaped sub floor gusset 82 which are joined to each other. The main floor gusset 81 is fixed to the main floor panel 21, and the sub floor gusset 82 connects an upper portion of the main floor gusset 81 and an intermediate portion of the wheel house connection gusset 70. That is, the floor gusset 80 connects a lower portion (lower gusset 72) of the wheel house connection gusset 70 and the main floor panel 21.

As shown in FIG. 10, the main floor gusset 81 is formed to circular concave in a saucer-like shape. This shape makes it possible to minimize a protruding amount of the main floor gusset 81 toward the cargo compartment T (an amount of upward protrusion relative to the main floor panel 21). Thus, even if the main floor gusset 81 is disposed to largely protrude laterally inward relative to the wheel house inner 51, the protruding amount toward the cargo compartment T can be minimized.

Figure 13:
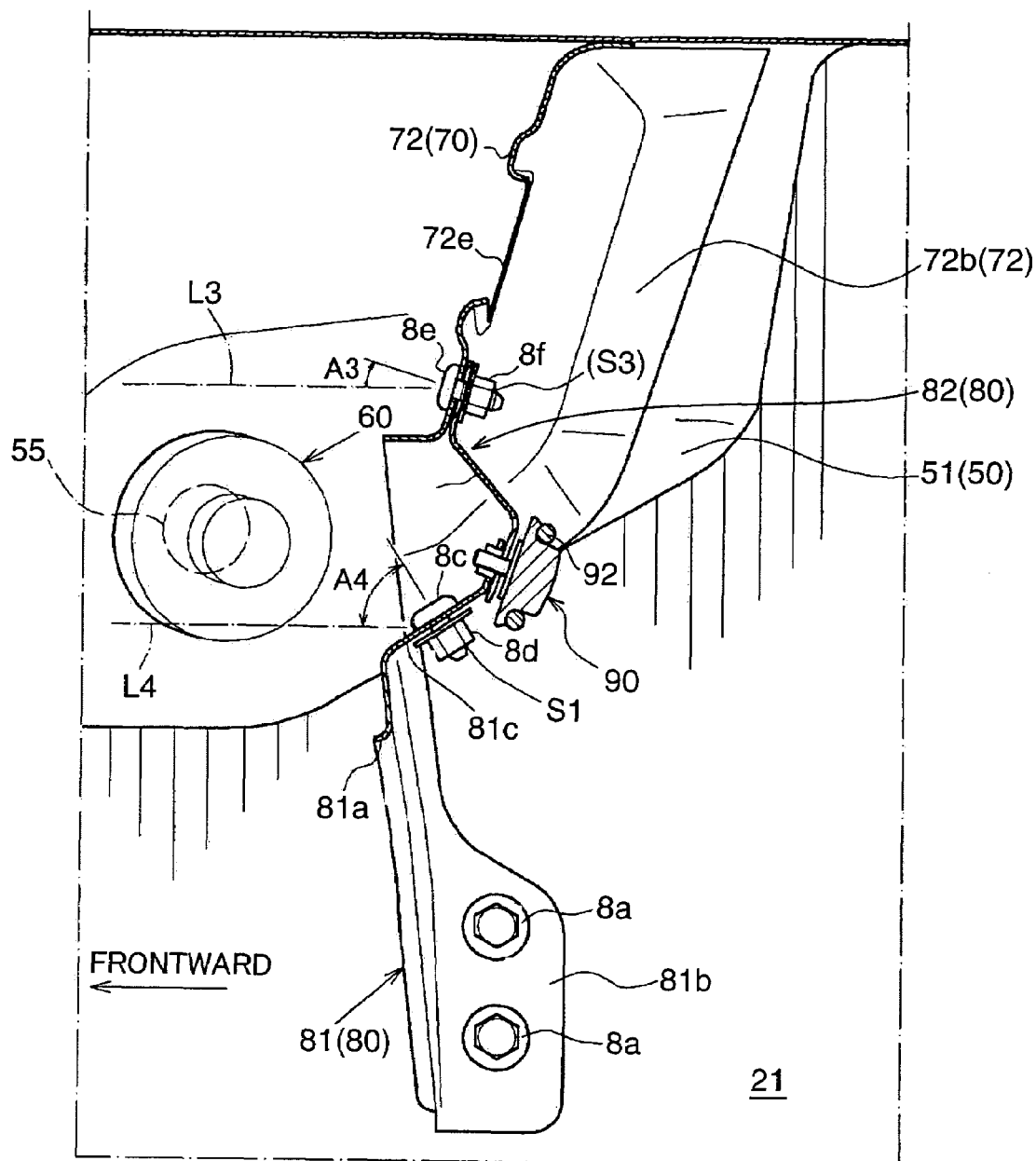
FIG. 13 is a top plan view of the sidewall of the rear cargo compartment in FIG. 10, which includes a section taken along the line XIII-XIII in FIG. 10.

Referring to FIG. 13, the main floor gusset 81 is formed with a bent flange 81a bent to extend in the frontward direction of the vehicle body 1, along a curved edge thereof. This makes it possible to enhance the rigidity of the main floor gusset 81 so as to allow the main floor gusset 81 to adequately transmit loads from the wheel house connection gusset 70 (load causing inward slant of the wheel house). The main floor gusset 81 has a lower edge formed with a floor fastening flange 81b extending in the lateral direction of the vehicle body, and an upper edge formed with a gusset fastening flange 81c extending in the vertical direction of the vehicle body while being convexed and concaved in the longitudinal direction of the vehicle body 1.

Referring to FIG. 10, the floor fastening flange 81b is tightly fixed to the main floor panel 21 by a fastener member (fastening bolt 8a and weld nut 8b). The fastener member (fastening bolt 8a and weld nut 8b) is fastened to be located within the rear side frame 22.

Figure 12:
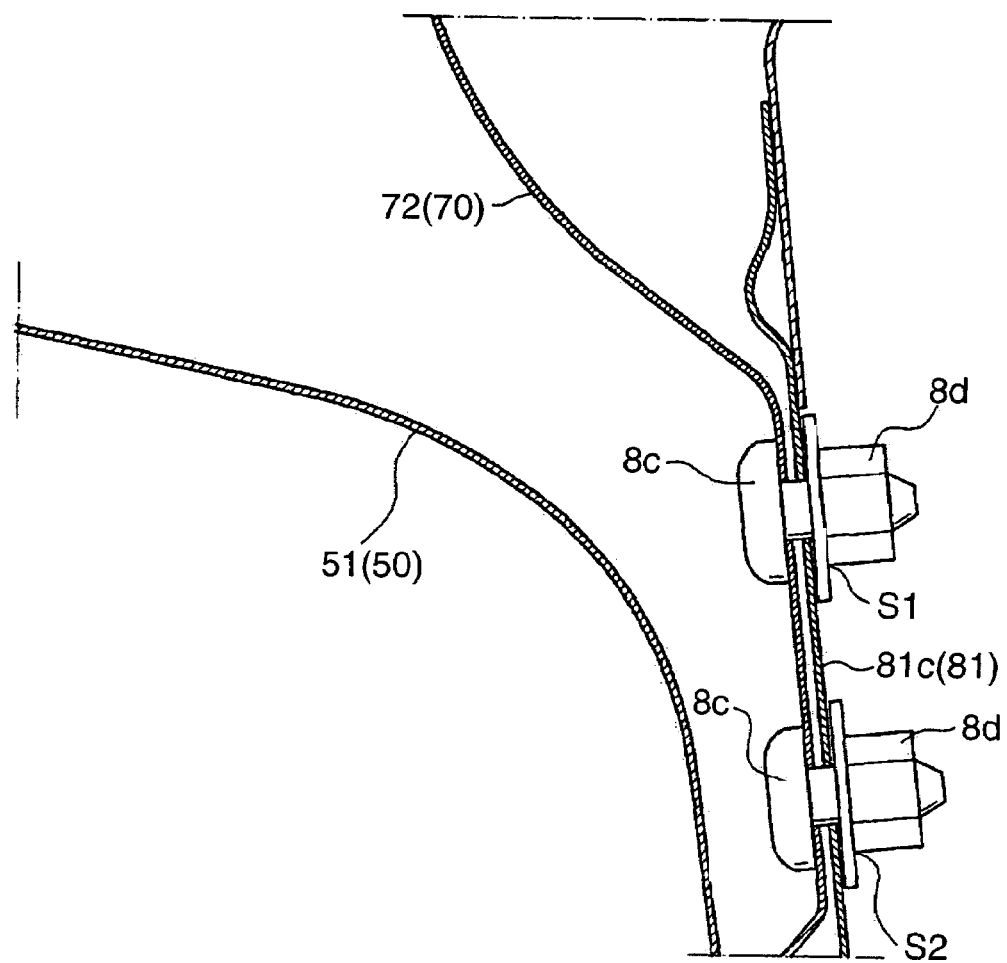
FIG. 12 is a sectional view taken along the line XII-XII in FIG. 10.

Referring to FIG. 12, the gusset fastening flange 81c is tightly fixed to the lower portion of the wheel house connection gusset 70 by a fastener member (stud bolt 8c and retainer nut 8d).

Referring to FIGS. 8, 10 and 11, the sub floor gusset 82 is integrally formed with a gusset junction-tongue 82a and a gusset fastening flange 82b. The gusset junction-tongue 82a extends downward from a lower portion of the gusset fastening flange 82b. The gusset fastening flange 82b is fixed to the intermediate portion of the wheel house connection gusset 70. Thus, the sub floor gusset 82 is integrally joined to the main floor gusset 81 by the gusset junction-tongue 82a, and firmly fixed to the intermediate portion of the wheel house connection gusset 70 by the gusset fastening flange 82b through a fastener member (stud bolt 8e and retainer nut 8f). Each of the gusset junction-tongue 82a and the gusset fastening flange 82b has an intermediate region formed as a bent portion (82c, 82d). These bent portions 82c, 82d make it possible to enhance the rigidity of sub floor gusset 82 itself so as to provide enhanced joint strength between the main floor gusset 81 and the intermediate portion of the wheel house connection gusset 70. In an assembling operation for the floor gusset 80, the gusset fastening flange 81c of the main floor gusset 81 and the gusset junction-tongue 82a of the sub floor gusset 82 are firstly joined together, an integrated assembly of the main floor gusset 81 and the sub floor gusset 82 are fixedly fastened to the main floor panel 21 and the wheel house connection gusset 70 using the respective fastener members.

Figure 14:
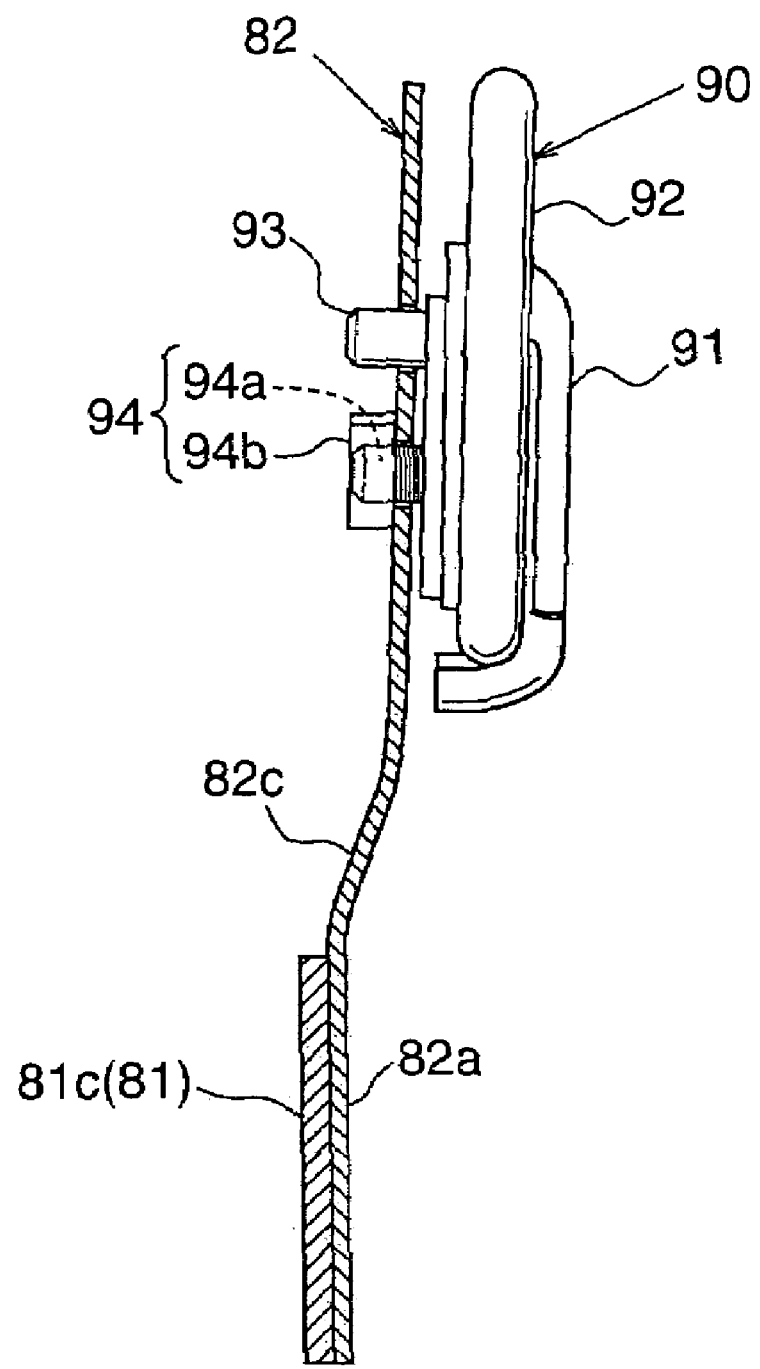
FIG. 14 is a sectional view taken along the line XIV-XIV in FIG. 10.

The sub floor gusset 82 has a central portion provided with a cargo hook 90 for fixing a cargo in the cargo compartment T. As shown in FIG. 14, the cargo hook 90 comprises a rectangular-shaped base case 91 and a U-shaped hook member 92 having a pivot at a lower end of the base case. The cargo hook 90 is fixedly fastened to the sub floor gusset 82 by a positioning boss 93 and a fastener member (bolt 94a and weld nut 94b) on a back surface of the base case 91

The wheel house connection gusset 70 and the floor gusset 80 are fastened together at a plurality of fastening points, as shown, for example, in FIG. 10. Specifically, three fastening points of two fastening points S1, S2 (see FIG. 12) of the lower-side the main floor gusset 81 spaced apart from each other in the vertical direction and a fastening point S3 of the upper-side sub floor gusset 82 are set up.

As shown in FIG. 9, each of the fastening points S1, S2, and S3 is set at a position apart from the mounting portion 53 of the rear suspension damper 61 in the vertical direction (each vertical position of the fastening point S1 and the fastening points S3 is indicated by the one-dot chain line H). This makes it possible to provide a relatively long support span so as to ensure supporting rigidity in the vertical direction against the vertical loads acting to the mounting portion 53 to adequately transmit the transmit load to the floor gusset 80 and the wheel house connection gusset 70.

While each position of the fastening points S1, S2, and S3 in this embodiment, is determined on the basis of the mounting portion 53, it is not necessarily determined on the basis of the mounting portion 53, but the same effect can be obtained as long as a relatively long the support span is ensured in the vertical direction.

As shown in FIG. 13, each of the fastening points S1, S2, and S3 is set at a position deviating from the mounting portion 53 in the lateral direction (each lateral position of the fastening point S1 and the fastening points S3 is indicated by the two-dot chain line L). Thus, a connected body of the wheel house connection gusset 70 and the floor gusset 80 can be supported by a relatively long span in the lateral direction to ensure high support rigidity against the lateral load (inward-slanting load) apply to the mounting portion 53.

Further, as to a fastening direction of the fastener member to be fastened to each of the fastening points S1, S2, and S3, the fastening point S3 of the sub floor gusset 82 is fastened while being inclined at an angle A3 (about 15 degrees) in a clockwise direction in FIG. 13 with respect to a longitudinal axis L3 of the vehicle body 1, and the fastening point S1 of the main floor gusset 81 is fastened while being inclined at an angle A4 (about 55 degrees) in the clockwise direction in FIG. 13 with respect to a longitudinal axis L4 of the vehicle body 1. Thus, even if a load transmit in a specific direction, such as loads in a torsional direction, occurs, the supporting rigidity for the mounting portion 54 can be reliably ensured without deterioration in fastening force of the fastener member.

While each of the fastening points S1, S2, S3 in this embodiment is fastened along a horizontal direction, a part or the entire of the fastener members to be fastened to the fastening points S1, S2, S3 may be inclined relative to the horizontal direction.

Referring to FIGS. 16 to 19, a connection plate 100 is arranged between the rear side frame 22 and the body sidewall 30 to extend in the lateral direction of the vehicle body so as to connect the rear side frame 22 and the body sidewall 30. The connection plate 100 is disposed under the main floor panel 21 in a position just below the wheel house inner 51. The connection plate 100 in this embodiment is a structural body formed of two components consisting of a horizontally-long flat plate-like plate body 110 located on the frontward side of the vehicle body 1, and an irregular/complex/complicated-shaped bracket-like bracket body 120 located on the rearward side of the vehicle body 1, which are joined together.

The plate body 110 has a wheel house joint flange 111 at an upper edge thereof. The wheel house joint flange 111 is joined to a lower end portion 51a of the wheel house inner 51 formed in the rear region thereof to protrude above the side floor panel 27. This structural body reinforces the lower end portion 51a of the wheel house inner 51. The plate body 110 has an outward edge formed as a side panel junction flange 112. This side panel junction flange 112 is bent to extend in the rearward direction of the vehicle body 1, and joined to an inward side surface of the body sidewall 30. Thus, the plate body 110 is jointed to the body sidewall 30. The plate body 110 has a lower edge formed as a bent flange 113. The bent flange 113 formed to extend in the lateral direction of the vehicle body can increase lateral rigidity of the plate body 110.

The bracket body 120 comprises a frame side-surface junction flange 121 bent to extend in the rearward direction of the vehicle body 1, a frame bottom-surface junction flange 122 bent to extend in the rearward direction of the vehicle body 1, and a floor junction flange 123 bent to extend in the rearward direction of the vehicle body 1. These flanges 121 to 123 make up a three-point support structure. The frame side-surface junction flange 121 is formed along an inward edge of the bracket body 120, and joined to an outward side surface 22a of the rear side frame 22. The frame bottom-surface junction flange 122 is formed along a lower edge of the bracket body 120, and joined to a bottom surface 22b of the rear side frame 22. Thus, the bracket body 120 is jointed to the rear side frame 22. The floor junction flange 123 is formed along an upper edge of the bracket body 120, and joined to the bottom surface of the side floor panel 27. Based on this structure, the connection plate 110 can reinforce the lower end portion 51a of the wheel house inner 51 by strong rigidity thereof. Further, the suspension loads transmitted from the mounting portion 53 for the rear suspension damper 61 can be distributedly transmitted to not only the rear side frame 22 and the body sidewall 30 but also the side floor panel 27.

As above, the connection plate 100 formed by superimposedly joining the two components of the bracket body 120 and the plate body 110 extends in the lateral direction of the vehicle body to connect the rear side frame 22 and the outer panel 32 of the body sidewall 30.

Then, the wheel house joint flange 111 of the laterally-extending connection plate 100 is joined to the lower end portion 51a of the wheel house inner 51 to reinforce the lower end portion 51a of the wheel house.

Figure 17:
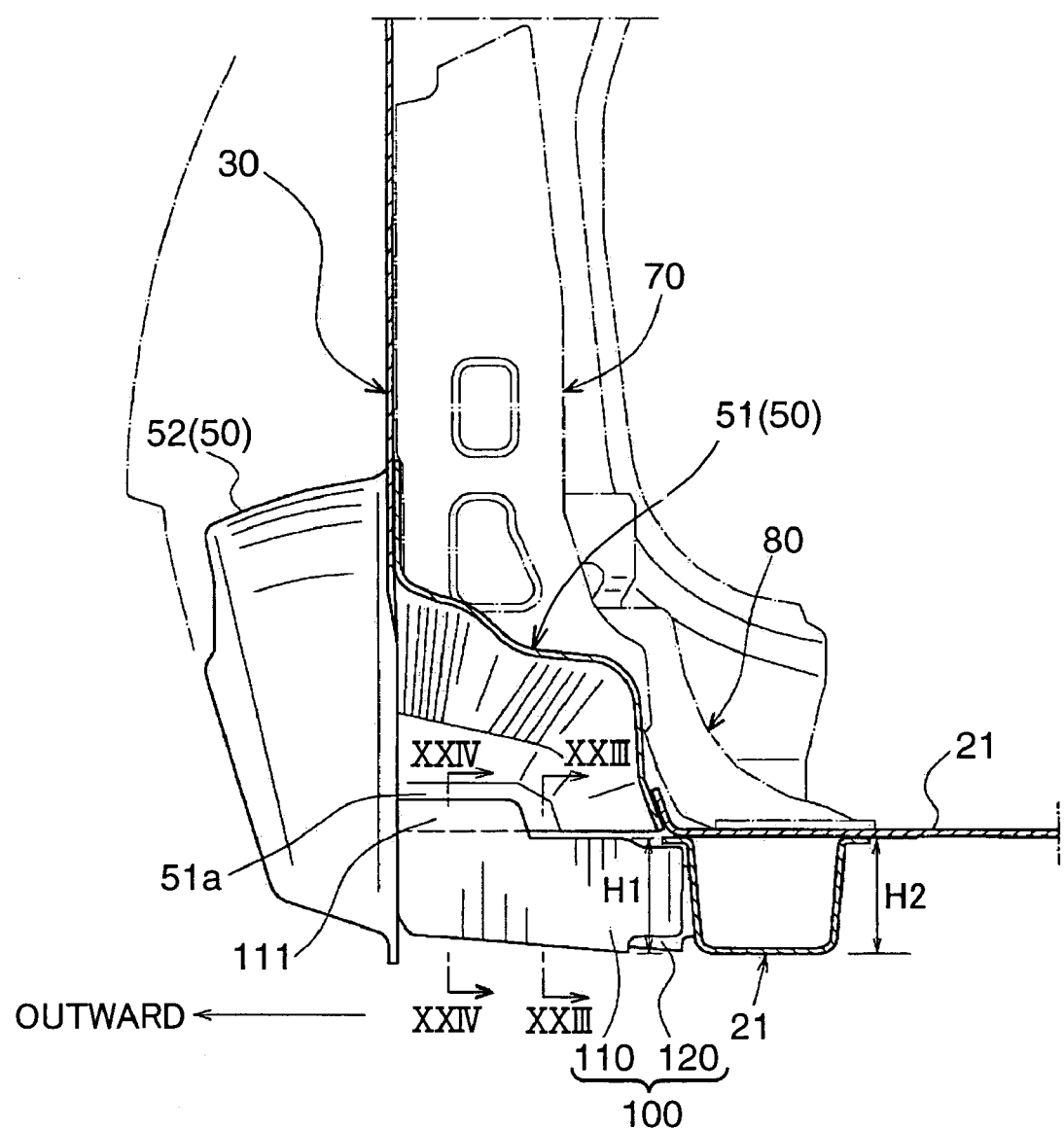
FIG. 17 is a front sectional view taken along the line XVII-XVII in FIG. 2, as viewed rearward from the side of a front end of the vehicle body.
Figure 18:
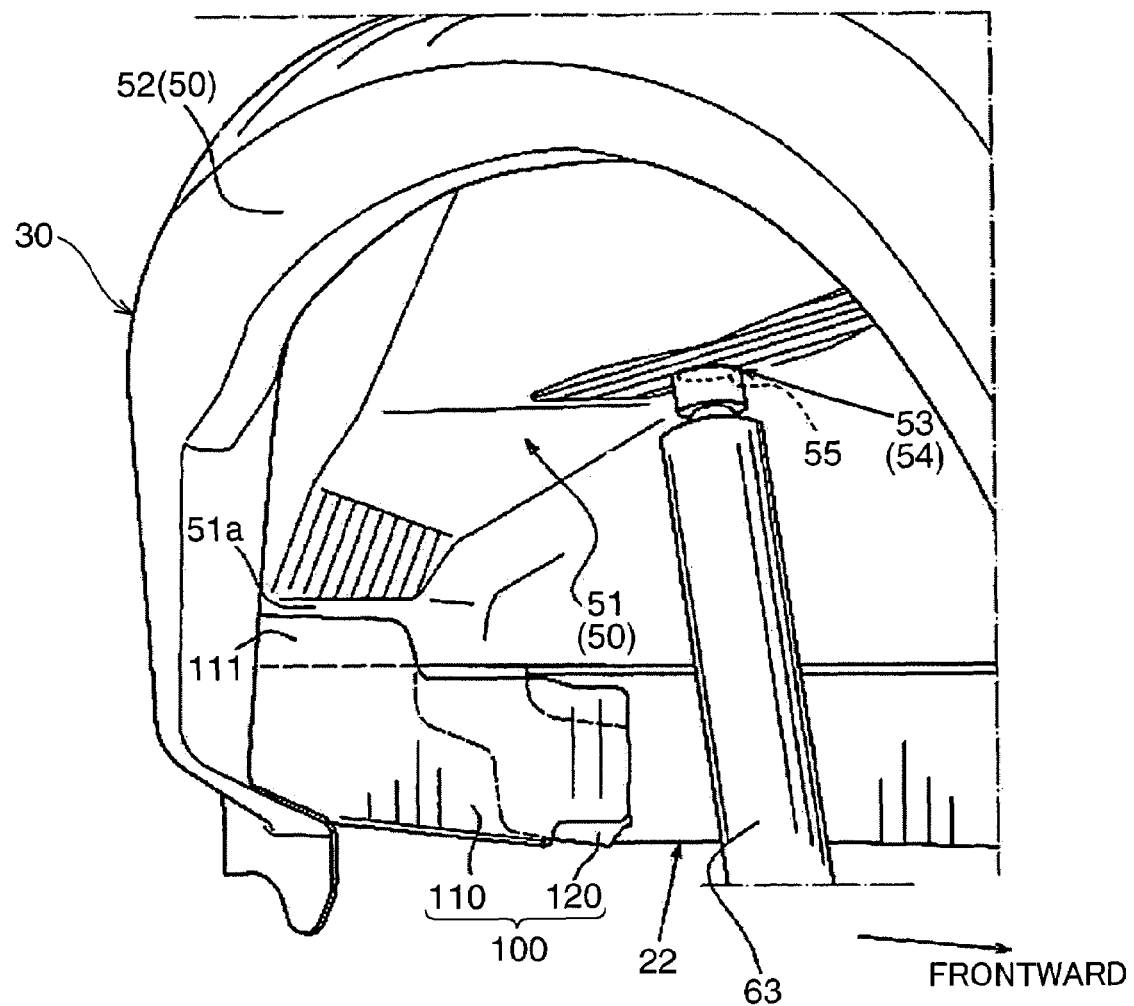
FIG. 18 is a detailed perspective view showing a vehicle body structure in a vicinity of a connection plate member, as viewed from the side of the front end of the vehicle body.
Figure 19:
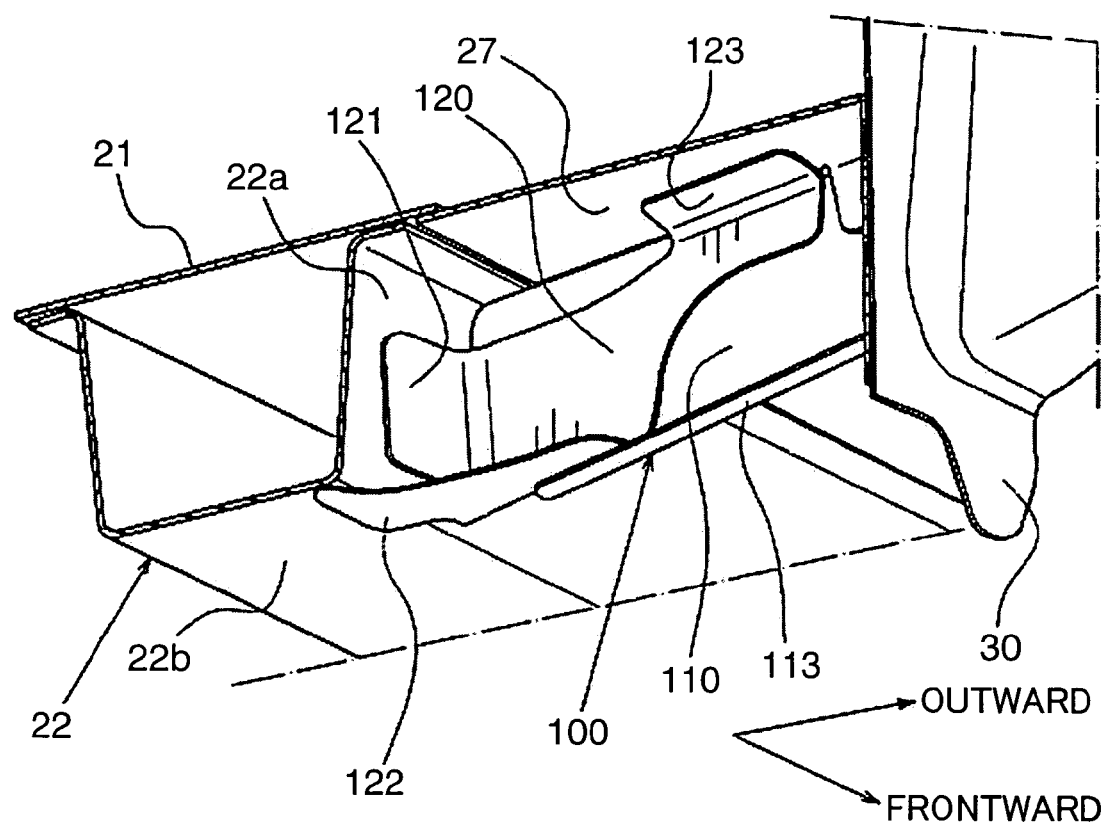
FIG. 19 is a detailed perspective view showing the vehicle body structure in the vicinity of the connection plate member, as viewed from the side of the rear end of the vehicle body.
Figure 20:
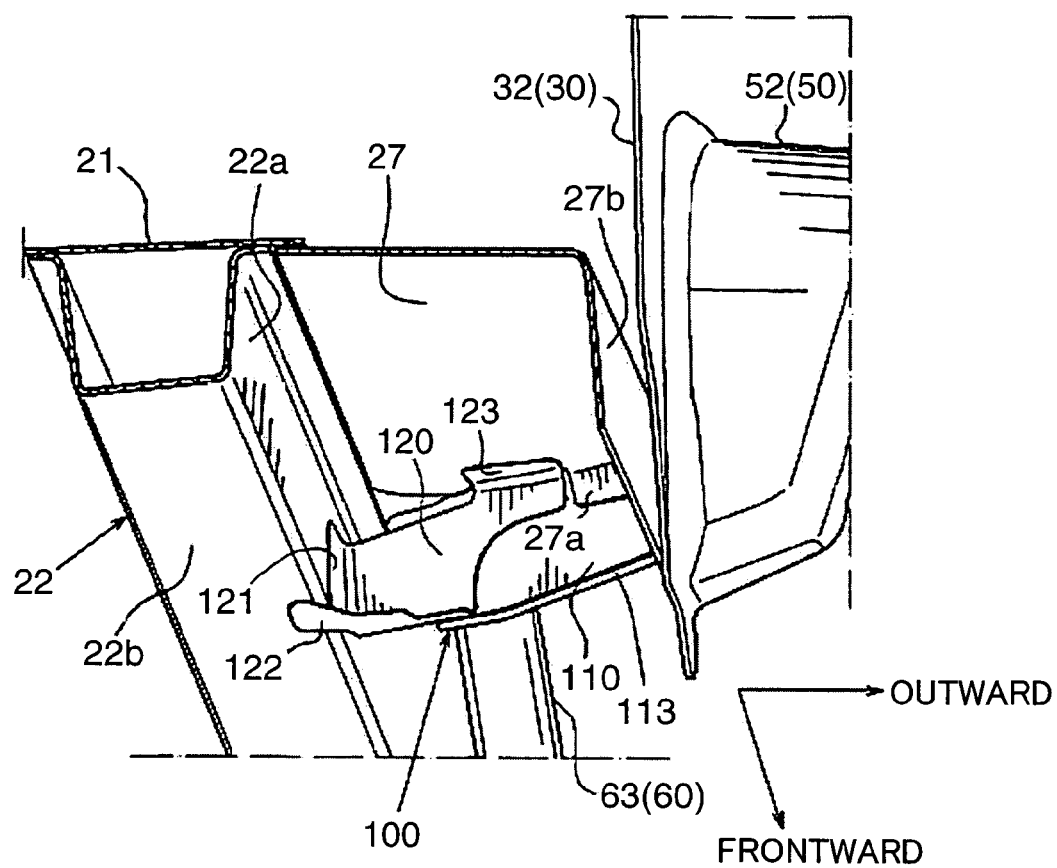
FIG. 20 is a detailed perspective view showing the vehicle body structure in the vicinity of the connection plate member, as viewed from a different angle.

As shown in FIG. 17, the connection plate 100 has a height dimension H1 set at a value approximately equal to a height dimension H2 of the rear side frame 22. Thus, the rigidity of the connection plate 100 can be ensured at the greatest extent without a downward protrusion of the connection plate 100 from the rear side frame 22.

Further, in order to achieve further enhanced junction strength, each junction portion of the connection plate 100 is designed as follows.

Figure 16:
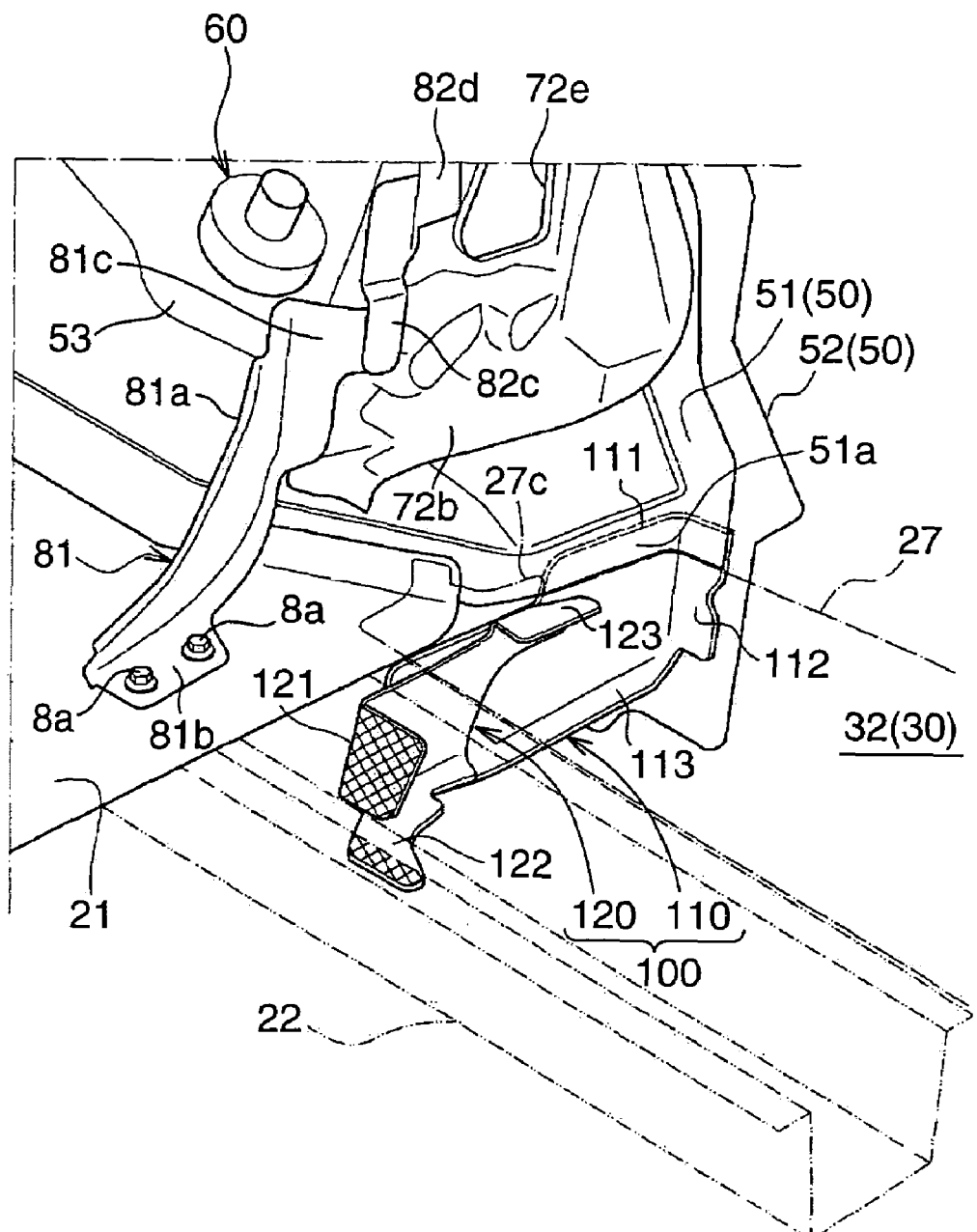
FIG. 16 is a perspective view showing the rear potion of the vehicle body, wherein a floor panel is removed, and a rear side frame is transparently illustrated.
Figure 21:
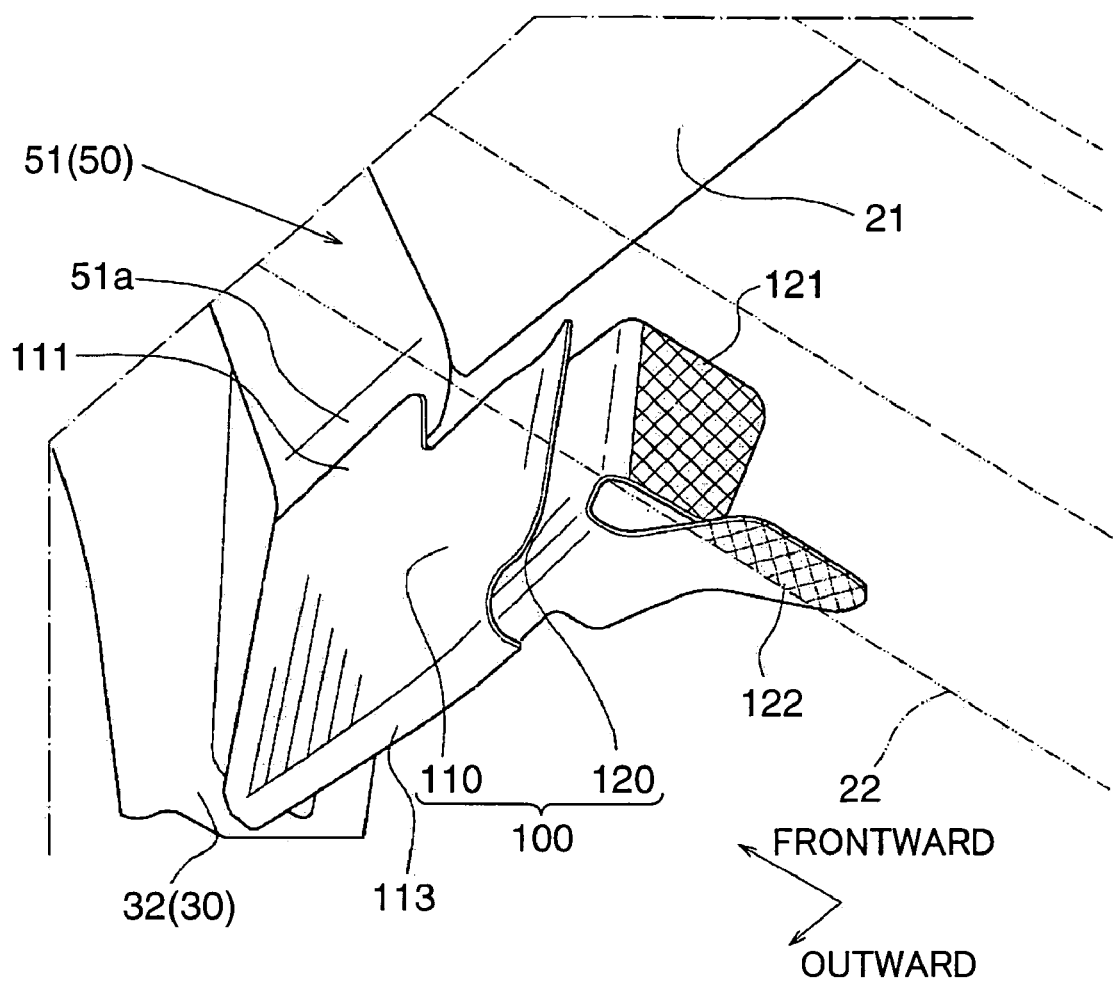
FIG. 21 is a perspective view showing the vehicle body structure in the vicinity of the connection plate member, as viewed from a laterally inward position, wherein the rear side frame is transparently illustrated.
Figure 22:
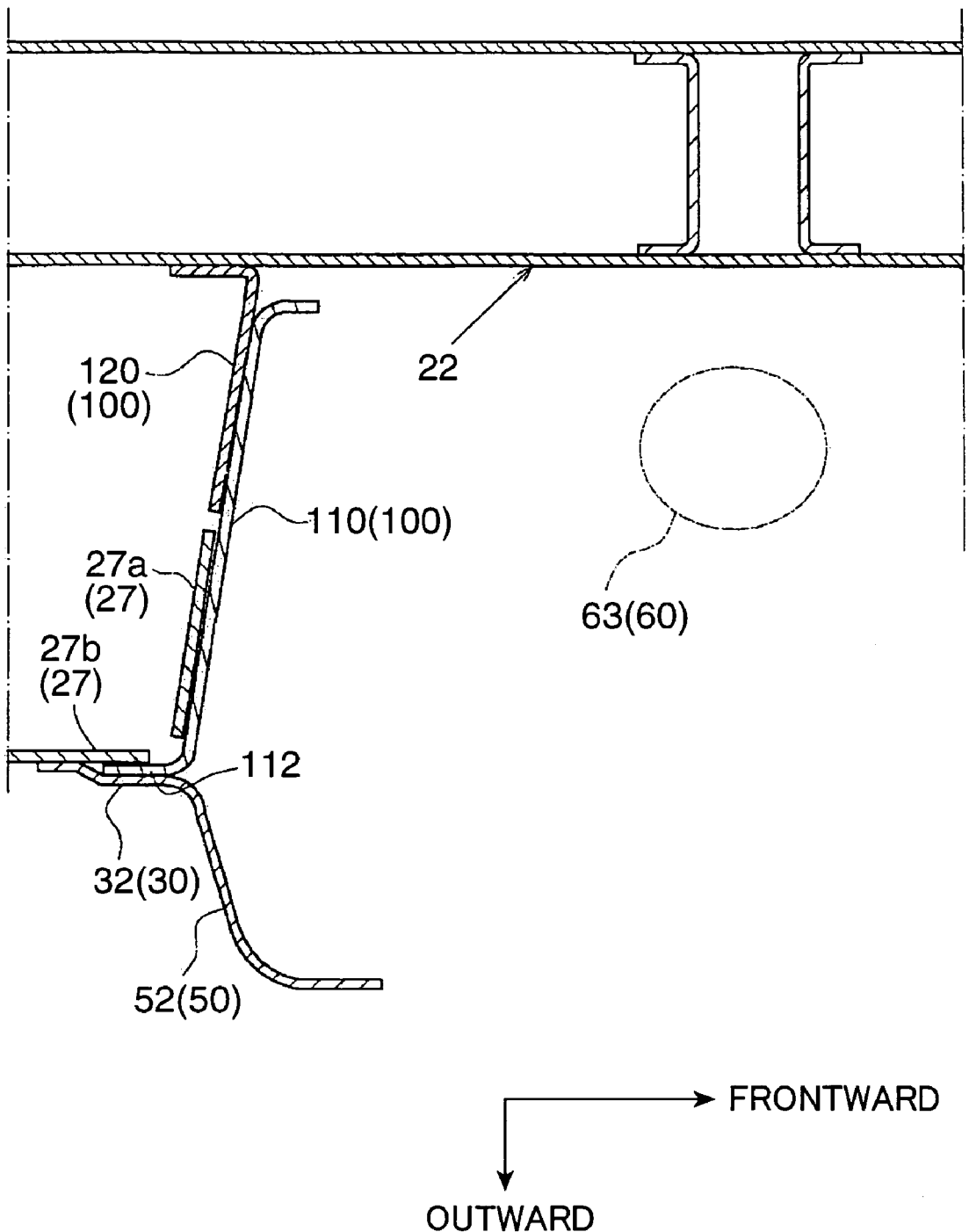
FIG. 22 is a sectional view taken along the line XXII-XXII in FIG. 2.

Firstly, referring to FIGS. 16 and 21, in a junction portion between the connection plate 100 and the rear side frame 22, the frame side-surface junction flange 121 and the frame bottom-surface junction flange 122 are joined, respectively, to the outward side surface 22a of the rear side frame 22 and the bottom surface 22b of the rear side frame 22. The two-surface junction allows the transmit loads to be received by not only the outward side surface 22a but also the bottom surface 22b of the rear side frame 22, so as to facilitate load distribution in the joint portion with the rear side frame 22 which is likely to cause load concentration to enhance the junction strength between the connection plate 100 and the rear side frame 22. Further, as to each junction area of the junction flanges 121, 122, in order to allow each of the junction flanges 121, 122A to be joined to the rear side frame 22 in a maximally wide range, the junction flange 121 is designed to have a wide junction area in the vertical and longitudinal directions of the vehicle body 1, and the junction flange 122 is designed to have a wide junction area in the longitudinal directions of the vehicle body 1. Thus, the junction strength of the connection plate 100 to the rear side frame 22 can be further enhanced.

Referring to FIGS. 16 to 22, the connection plate 100 is joined to the body sidewall 30 while allowing the side panel junction flange 112 to be sandwiched between the body sidewall 30 and the outward junction flange 27b of the side floor panel 27. Thus, in the junction portion with the body sidewall 30 which is likely to cause load concentration, both surfaces of the side panel junction flange 112 of the connection plate 100 are firmly sandwiched between the side floor panel 27 and the body sidewall 30, and joined and fixed to the body sidewall 30. This allows the connection plate 100 to be firmly joined and fixed in the junction portion with the body sidewall 30.

Figure 24:
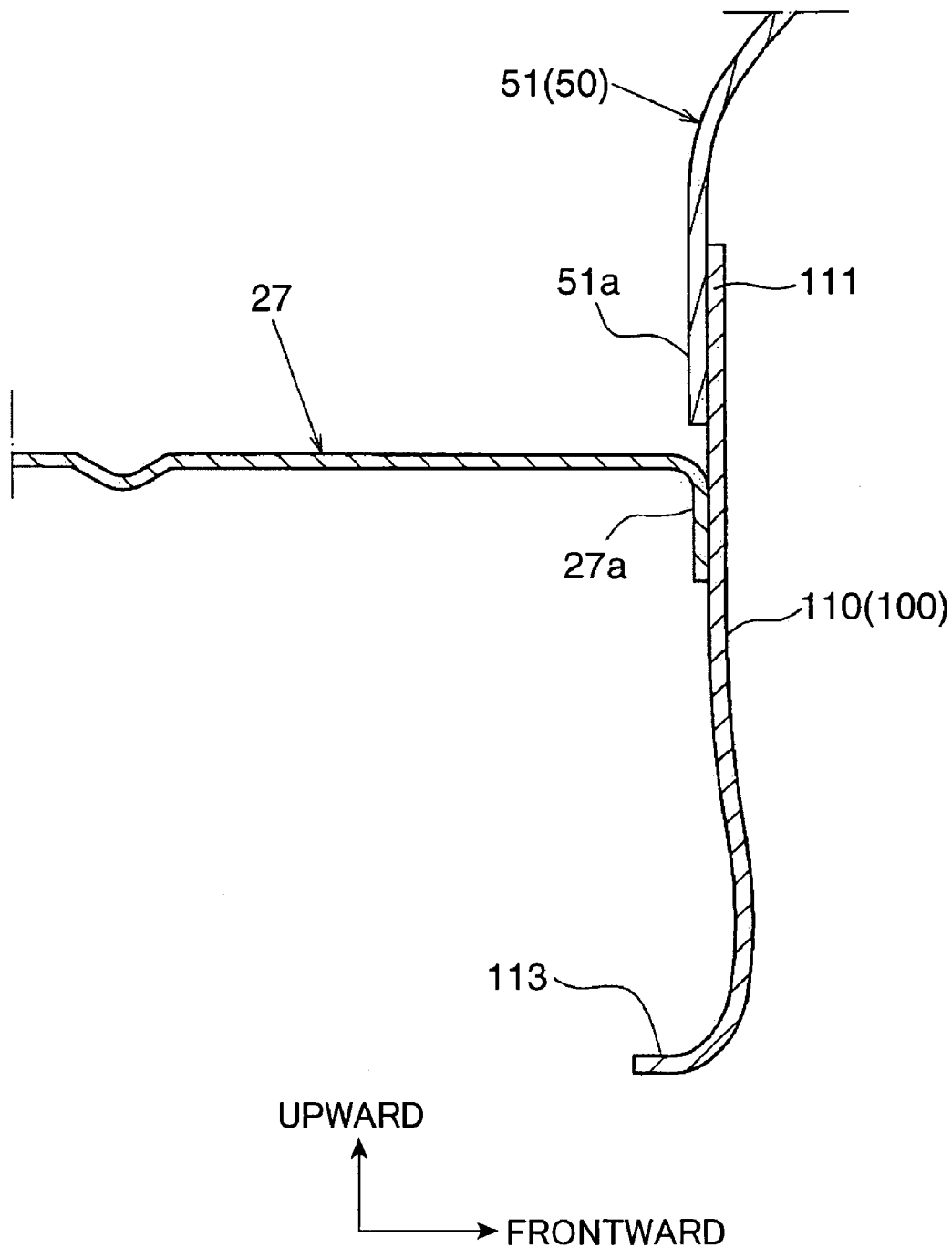
FIG. 24 is a sectional view taken along the line XXIV-XXIV in FIG. 17.

Referring to FIGS. 23 and 24, in the first embodiment, a structure for enhancing junction strength is also employed in the joint portion between the connection plate 100 and the side floor panel 27. Specifically, the floor junction flange 123 of the bracket body 120 is joined to the side floor panel 27 at a laterally inward position as shown in FIG. 23, and the front-downward junction flange 27a of the side floor panel 27 is joined to the plate body 110 at a laterally outward position as shown in FIG. 24. Thus, approximately the entire region of the connection plate 100 is joined to the side floor panel 27. This also allows the connection plate 100 to be firmly joined and fixed to the side floor panel 27 so as to further reliably fix the position thereof.

As shown in FIG. 23, the front edge of the side floor panel 27 has the front-upward junction flange 27c bent to extend upward. This front-upward junction flange 27c is also joined to the lower end portion 51a of the wheel house inner 51. Thus, the lower end portion 51a of the wheel house inner 51 is joined directly to the side floor panel 27 to allow the wheel house 50 to have further enhanced rigidity.

The vehicle body structure according to the first embodiment comprises the side brace 56 as a first connection member which connects the side pillar reinforcing member 34 and a lower end of the wheel house 50, the wheel house connection gusset 70 as a second connection member which connects the rear pillar reinforcing member 45 and the rear region of the wheel house 50, and the belt line reinforcing member 39 as third connection member which connects the side pillar reinforcing member 34 and the rear pillar reinforcing member 45, in a position above the wheel house 50. Thus, the region of the body sidewall 30 located above the wheel house 50 and rearward thereof can be reinforced to enhance the torsional rigidity of the body sidewall 30.

Further, the wheel house connection gusset 70 is arranged to extend upward from the wheel house 50, and jointed to the rear pillar reinforcing member 45 in the joint portion between the belt line reinforcing member 39 and the rear pillar reinforcing member 45 and/or a vicinity of the joint portion. Thus, the side pillar reinforcing member 34, the side brace 56, the main floor panel 21, the wheel house connection gusset 70, the rear pillar reinforcing member 45, and the belt line reinforcing member 39 are connected together in a quadrangular shape in side view, to allow the body sidewall 30 to be reinforced so as to further enhance the torsional rigidity of the body sidewall 30.

For example, loads apply to the wheel house 50 through the rear suspension system 60 can be transmitted to the side pillar reinforcing member 34 through the side brace 56 and further to the rear pillar reinforcing member 45 through the wheel house connection gusset 70. Thus, the loads can be effectively distributed to each portion of the vehicle body to achieve enhanced steering stability.

Further, the wheel house connection gusset 70 is jointed to the rear pillar reinforcing member 45 in a position laterally inward of the joint portion between the belt line reinforcing member 39 and the rear pillar reinforcing member 45. Thus, lateral torsional rigidity of the body sidewall 30 can be further enhanced in its region located above the wheel house and rearward thereof.

The main floor panel 21 is jointed to the longitudinally-extending rear side panel 22, and the rear pillar reinforcing member 45 is jointed to the rear end of the rear side panel 22. Thus, in a region of the body sidewall located rearward of the wheel house 50, the main floor panel 21, the rear side frame 22, the rear pillar reinforcing member 45 and the wheel house connection gusset 70 are connected together in a triangular shape in side view, to reinforce the body sidewall 30. This makes it possible to further enhance the torsional rigidity of the body sidewall 30.

Furthermore, the roof side rail reinforcing member 38 is disposed above the belt line reinforcing member 39 to connect the upper end of the side pillar reinforcing member 34 and the upper end of the rear pillar reinforcing member 45. Thus, in the region of the body sidewall 30 located above the wheel house 50 and rearward thereof, the side pillar reinforcing member 34, the side brace 56, the main floor panel 21, the wheel house connection gusset 70, the rear pillar reinforcing member 45 and the belt line reinforcing member 39 are connected together in a quadrangular shape in side view, and further the side pillar reinforcing member 34 and the wheel house connection gusset 70 are connected by the roof side rail reinforcing member 38, the belt line reinforcing member 39, the side brace 56 and the wheel house gusset 58, to form a two-storied shape in side view so as to reinforce the body sidewall 30. Thus, the torsional rigidity of the body sidewall 30 can be further enhanced.

The vehicle body structure according to the first embodiment includes the wheel house 50 having the mounting portion 53 on which the rear suspension damper 61 mounts in a position offset from the top region of the wheel house 50, the wheel house connection gusset 70 connecting the vicinity of the mounting portion 53 and the rear pillar 41 on the rearward side of the vehicle body 1, and the floor gusset 80 connecting the main floor panel 21 and the wheel house connection gusset 70. The floor gusset 80 is fixedly fastened to the wheel house connection gusset 70 in the vicinity of the mounting portion 53.

As above, in the first embodiment, the wheel house connection gusset 70 and the floor gusset 80 are fastened together in the vicinity of the mounting portion 53 to allow transmit loads from the rear suspension damper 61 to be reliably transmitted to each of the wheel house connection gusset 70 and the floor gusset 80. Thus, even in the vehicle body structure where the mounting portion 53 for the rear suspension damper 61 is formed in the lower portion of the wheel house 50, the transmit loads can be adequately distributed and transmitted to the rear pillar 41, the main floor panel 21 and the body sidewall 30 through the wheel house connection gusset 70 and the floor gusset 80 to enhance the supporting rigidity for mounting portion 52. Therefore, in the vehicle body structure where the mounting portion 53 for the rear suspension damper 61 is formed in the lower portion of the wheel house 50, the transmit loads from the rear suspension damper 61 can be reliably supported and distributedly transmitted to enhance the support rigidity so as to provide enhanced rigidity to the mounting portion 53 for the rear suspension damper 61.

In the first embodiment, the wheel house connection gusset 70 is jointed to the rear pillar reinforcing member 45 in a laterally inward position relative to the joint portion between the belt line reinforcing member 39 and the rear pillar reinforcing member 45. Thus, the lateral torsional rigidity of the body sidewall 30 can be further enhanced in its region located above the wheel house 50 and rearward thereof.

In the first embodiment, respective fastening directions in each of the fastening point S1 of the main floor gusset 81 and the fastening point S3 of the sub floor gusset 82 are set to be different from each other.

This makes it possible to prevent the fastening force between the wheel house connection gusset 70 and the floor gusset 80 from being lowered even if the mounting portion 53 is subjected to the loads in a torsional direction. Thus, reliably enhances the supporting rigidity for the mounting portion 53.

In the first embodiment, the floor gusset 80 comprises the main floor gusset 81 connecting the main floor panel 21 and the wheel house connection gusset 70, and the sub floor gusset 82 connecting the main floor gusset 81 and the wheel house connection gusset 70.

As above, the floor gusset 80 comprises two components of the main and sub floor gussets 81 and 82. Thus, when the sub floor gusset 82 is designed to additionally serve as a cargo bracket, these gussets 81 and 82 can be subjected to a press forming process on a gusset-by-gusset basis to facilitate the forming process and reduction in production cost.

In the first embodiment, the floor gusset 80 comprises the main floor gusset 81 and the sub floor gusset 82 which are separatable components from each other. This makes it possible to readily change a type of floor gusset 80, for example, with/without the sub floor gusset 82, depending on types of vehicles, sales territories of vehicle or the like, and use a common main floor gusset 81 for various types of vehicles.

Figure 29:
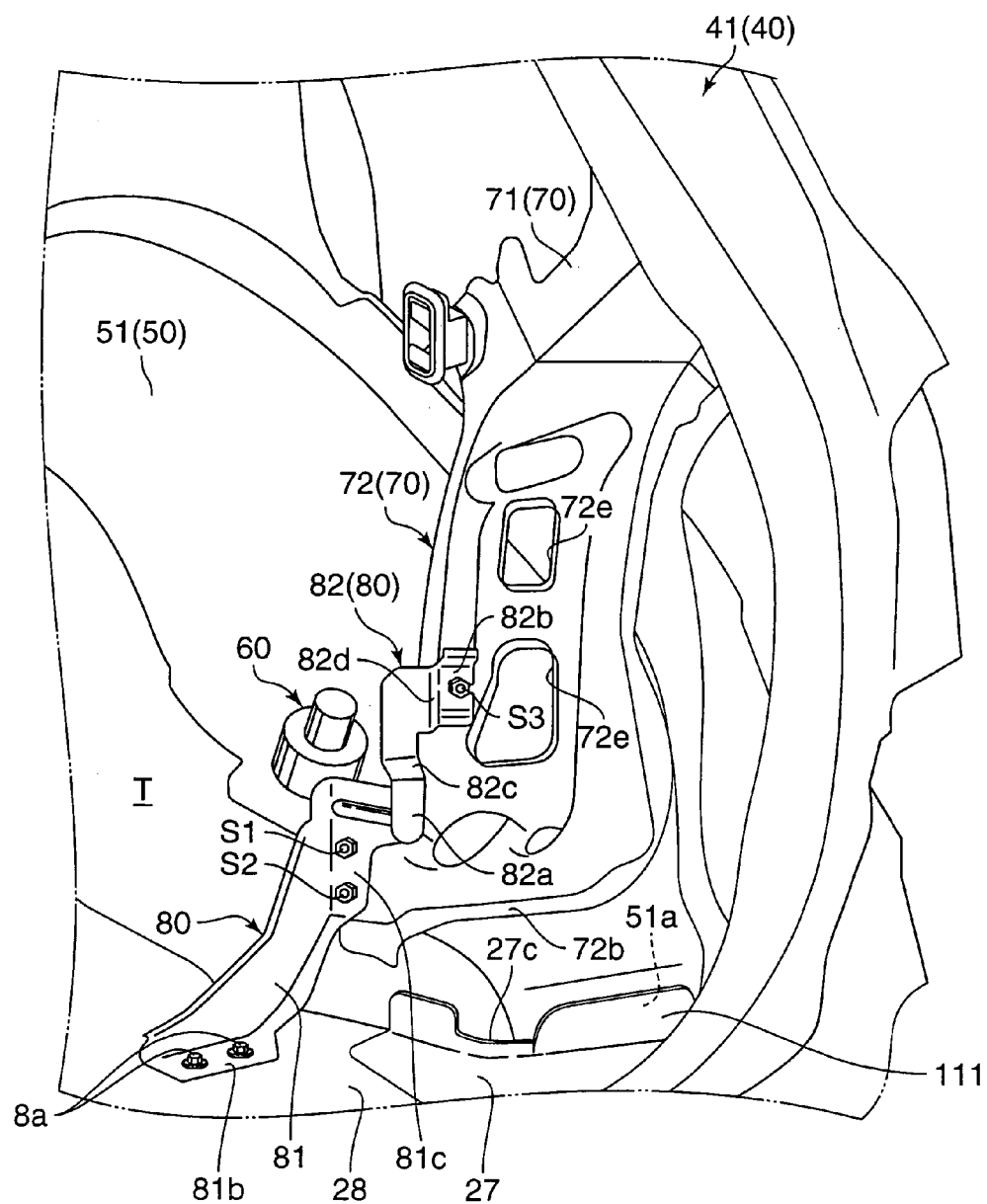
FIG. 29 is a perspective view corresponding to FIG. 8, which shows a fourth embodiment of the present invention.

For example, even in a vehicle body structure employing a sub floor gusset 82 without a cargo hook as shown in a fourth embodiment illustrated in FIG. 29, a main floor gusset 81 having a common shape can be used without changing a type or shape of the main floor gusset 81 to facilitate the shared use of components.

In the first embodiment, the sub floor gusset 82 is provided with the cargo hook 90.

Thus, the cargo hook 90 can be set up in the cargo compartment T by utilizing the sub floor gusset 82.

In the first embodiment, the cargo hook 90 is provided in the sub floor gusset 82 as a separatable component from the main floor gusset 81. Thus, the cargo hook 90 can be arranged at an optimal position for a shape of the cargo compartment T without changing the shape of the main floor gusset 81.

In the first embodiment, the inclination angle A1 of the wheel house connection gusset 70 in an extension direction thereof is set at a value approximately equal to the inclination angle A2 of the rear suspension damper 61.

Thus, the wheel house connection gusset 70 is arranged to stand against an input direction of major loads from the rear suspension damper 61, to allow the major input loads from the rear suspension damper 61 to be reliably transmitted to the wheel house connection gusset 70 so as to reliably suppress displacement of the mounting portion 53.

This makes it possible to improve the rigidity of the vehicle body so as to enhance the support rigidity of the mounting portion 53 and improve a steering performance of the vehicle.

In the first embodiment, each of the wheel house connection gusset 70 and the floor gusset 80 is arranged to extend in the vertical direction (see FIG. 9).

This allows the input loads from the mounting portion 53 to be distributed to the rear pillar 41, the main floor panel 21 and others stably and reliably without stress concentration due to bending, in the fastening points S1, S2, and S3 between the wheel house connection gusset 70 and the floor gusset 80.

Further, the vehicle body structure according to the first embodiment comprises the rear side frame 22 extending in the longitudinal direction of the vehicle body 1, the wheel house inner 51 located laterally outward of the rear side frame 22 and expanded in the inward direction of the vehicle body 1, and the body sidewall 30 located laterally outward of the wheel house inner 51 to define a sidewall of the vehicle body 1. The wheel house inner 51 has the lower end portion 51a formed in the lower end thereof to extend in the lateral direction of the vehicle body 1. Further, the connection plate 100 is provided between the rear side frame 22 and the body sidewall 30 to connect the rear side frame 22 and the body sidewall 30. The connection plate 100 is joined to the lower end portion 51a of the wheel house inner 51. Thus, in the first embodiment, the laterally-extending lower end portion 51a of the wheel house inner 51 is reinforced by the laterally-extending connection plate 100 connecting the rear side frame 22 and the body sidewall 30. This allows the laterally-extending lower end portion 51a of the wheel house inner 51 to be fixed to the body sidewall 30 through the connection plate 100 so as to obtain high rigidity.

Therefore, in the vehicle body structure having the wheel house 50 receiving therein a rear wheel, the rigidity of the lower end portion 51a of the wheel house inner 51 can be increased to enhance the torsional rigidity of the vehicle body so as to provide enhanced response of the vehicle body 1 during a steering operation.

In particular, the connection plate 100 which fixes the lower end portion 51a on the rearward side of the vehicle body 1 can prevent the occurrence of torsion in an outward end located rearward of the wheel house 50 which is a corner of the vehicle body, to reliably enhance the torsional rigidity of the vehicle body.

Further, in the event of a side-impact collision in the vehicle, the laterally-extending connection plate 100 which fixes the lower end portion 51a of the wheel house inner 51 can provide enhanced lateral rigidity to the lower end portion 51a of the wheel house inner 51 so as to improve side-impact performance of the vehicle.

In the first embodiment, the lower end portion 51a is arranged in vicinity of the mounting portion 53. Thus, the wheel house inner 51 is reinforced by the connection plate 100 through the lower end portion 51a, to allow loads transmitted from the rear suspension damper 61 to the mounting portion 53 to be distributed to the rear side frame 22 and the body sidewall 30 so as to prevent the wheel house inner 51 from being easily deformed. This makes it possible to prevent deterioration in the response of the vehicle body during the steering operation due to deformation in the mounting portion 53 for the rear suspension damper 61.

In the conventional vehicle structure where the mounting portion 53 for the rear suspension damper 61 is arranged in the top region of the wheel house 50, there is also the need for enhancing the torsional rigidity of the vehicle body to improve the response of the vehicle body during a starring operation. In view of meeting with this need, it is desirable to enhance the rigidity of the lower end portion 51a of the wheel house inner 51 located in a corner region of the vehicle body so as to suppress torsion of the wheel house 50. Thus, as to such a need, the connection plate 100 in the first embodiment can suppress torsion of the wheel house 50.

Second Embodiment

A second embodiment of the present invention will be described below. In descriptions about the following embodiments, the same component or member as that in the first embodiment is defined by the same reference numeral or code, and its duplicate description will be omitted.

Figure 25:
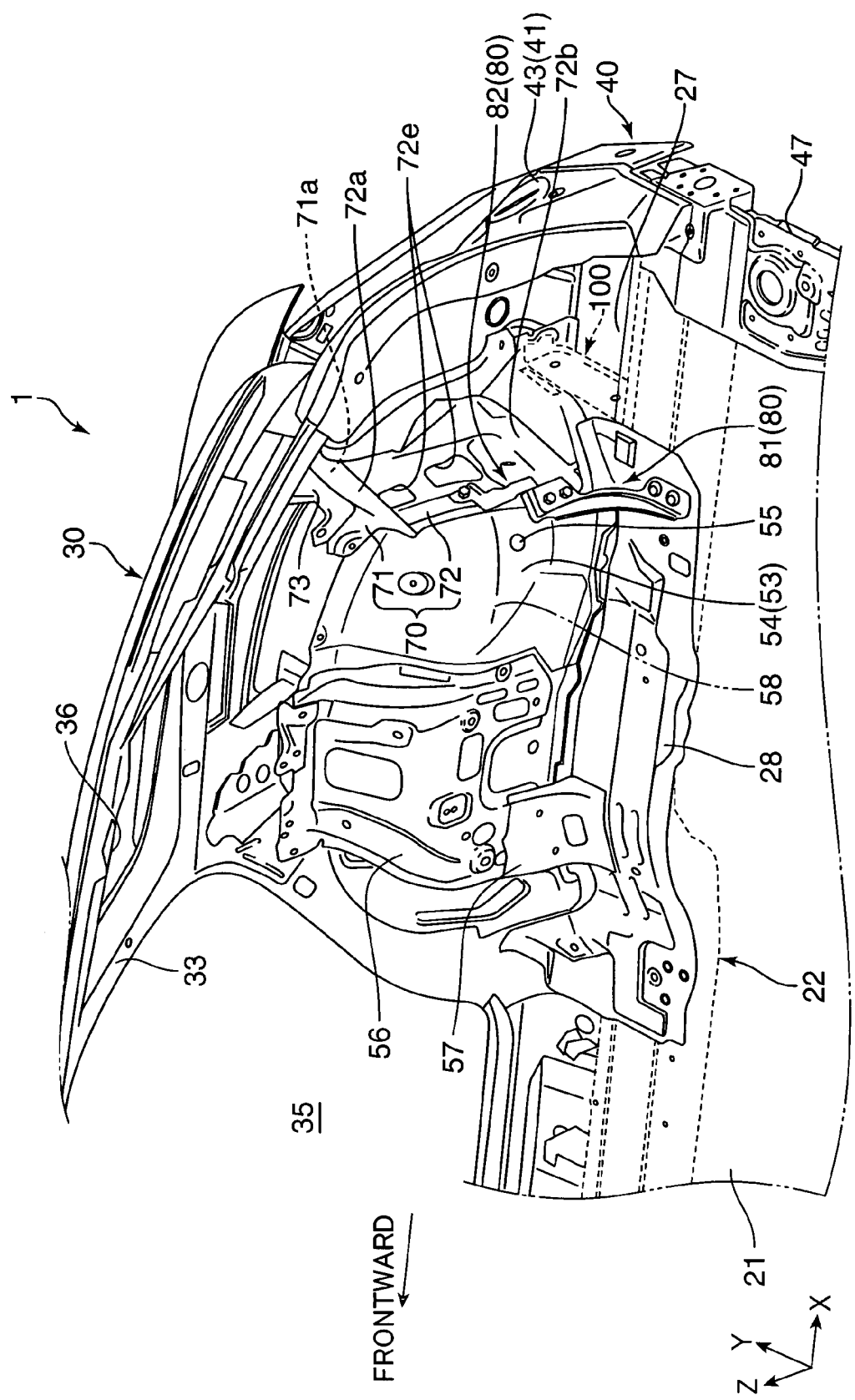
FIG. 25 is a perspective view schematically showing a rear portion of a vehicle body according to a second embodiment of the present invention.
Figure 26:
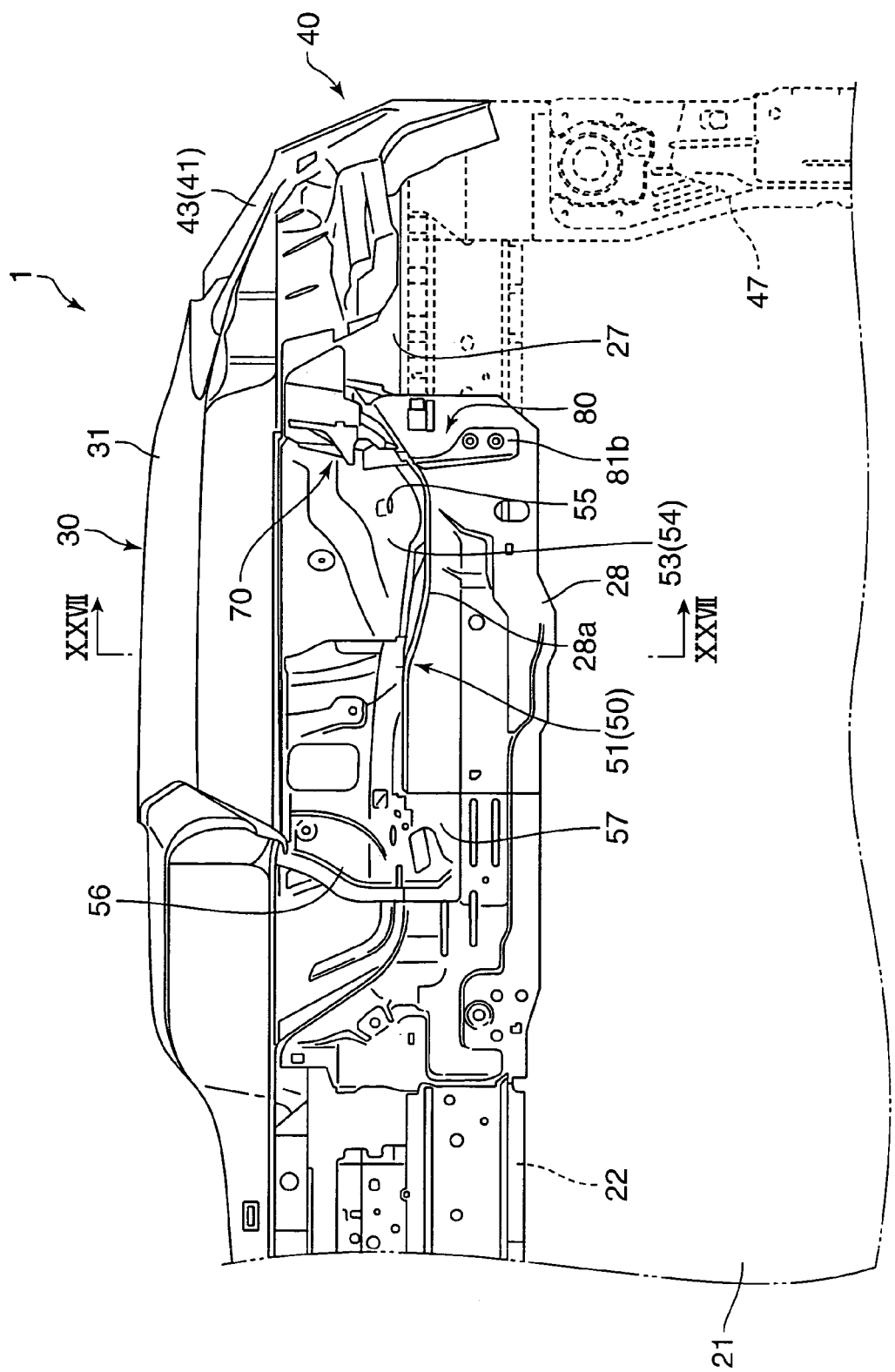
FIG. 26 is a top plan view showing the rear potion of the vehicle body in FIG. 25, wherein an inner panel is partially removed.

Referring to FIGS. 25 and 26, in the second embodiment illustrated in these figures, a floor reinforcing member 28 formed as a separate component from the rear side frame 22 is arranged on an laterally inward edge of the rear side frame 22.

Figure 27:
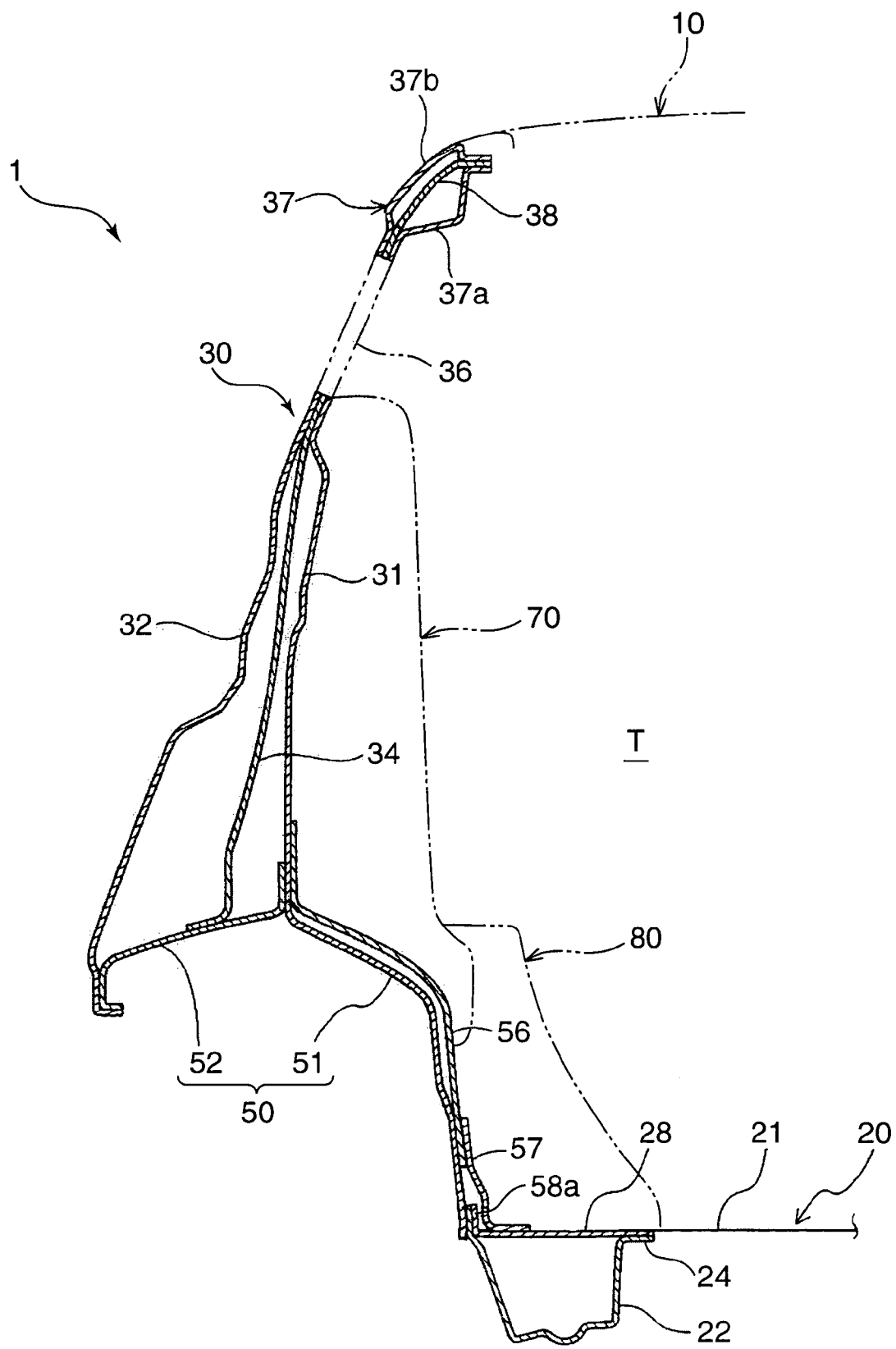
FIG. 27 is an explanatory sectional view taken along the line XXVII-XXVII in FIG. 26.

Additionally referring to FIG. 27, the floor reinforcing member 28 is a plate member having approximately rectangular shape and a plate thickness (e.g., 1.0 mm) about two times greater than a thickness (e.g., 0.5 mm) of the main floor panel 21. The floor reinforcing member 28 has a flange 28a located on a laterally outward side thereof and formed to conform to a profile of a lower end of the wheel house inner 51. As shown in FIG. 27, the rear side frame 22 has an outward side flange 24 partly formed as an upward standing portion joined along the lower end of the wheel house inner 51. The flange 28a of the floor reinforcing member 28 is superimposed on the junction portion between the rear side frame 22 and the wheel house inner 51 and joined to the wheel house inner 51 together with the rear side frame 22. Further, the floor reinforcing member 28 has a laterally inward edge is joined to a top surface of a laterally inward side flange 24 of the rear side frame 22. The main floor panel 21 is cut out to have an opening for the floor reinforcing member 28, and an inner peripheral edge of the opening is joined to an outer peripheral edge of the floor reinforcing member 28.

In the second embodiment, the lower end of the side brace 56 formed to extend approximately along the wheel house inner 51 is connected to the floor reinforcing member 28 through the brace bracket 57.

In the second embodiment, the side brace 56 may also be formed to extend up to the floor reinforcing member 28, and joined to the floor reinforcing member 28.

In the second embodiment, the side pillar reinforcing member 34, the side brace 56, the floor reinforcing member 28, the wheel house connection gusset 70, the rear pillar reinforcing member 45 and the belt line reinforcing member 39 are connected together in a substantially quadrangular shape in side view, and further the side pillar reinforcing member 34, the belt line reinforcing member 39, the rear pillar reinforcing member 45 and the roof side rail reinforcing member 38 are connected together in a substantially quadrangular shape in side view. Further, in the above vehicle body 1, the floor reinforcing member 28, the rear pillar reinforcing member 45 and the wheel house connection gusset 70 are connected together in a substantially triangular shape in side view.

Further, in the second embodiment, the wheel house connection gusset 70 extends upward from the wheel house 50, and jointed to the rear pillar reinforcing member 45 in the joint portion 46 between the belt line reinforcing member 39 and the rear pillar reinforcing member 45 and/or a vicinity of the joint portion 46. Thus, the side pillar reinforcing member 34, the side brace 56, the floor reinforcing member 28, the wheel house connection gusset 70, the rear pillar reinforcing member 45 and the belt line reinforcing member 39 can be connected together in a substantially quadrangular shape in side view to further improve the torsional rigidity of the body sidewall 30.

Furthermore, in the second embodiment, the floor reinforcing member 28 forms a quadrangular-shaped jointed body in cooperation with the side pillar reinforcing member 34, the side brace 56, the wheel house connection gusset 70, the rear pillar reinforcing member 45 and the belt line reinforcing member 39, to allow the body sidewall 30 to be further strongly reinforced and further improved in torsional rigidity.

In addition, the floor reinforcing member 28 is jointed to the longitudinally-extending rear side frame 22, and the rear pillar reinforcing member 45 is jointed to the rear end of rear side frame 22. Thus, in a region of the body sidewall 30 located rearward of the wheel house 50, the floor reinforcing member 28, the rear side frame 22, the rear pillar reinforcing member 45 and the wheel house connection gusset 70 can be connected together in a substantially triangular shape in side view, to reinforce the body sidewall 30 so as to further improve the torsional rigidity of the body sidewall 30.

In the second embodiment, the lower portion of the side brace 56 and the wheel house connection gusset 70 are fixed to the floor reinforcing member 28, respectively, through the brace bracket 57 and the floor gusset 80. Thus, in the second embodiment, in corporation with the side brace 56 and the wheel house connection gusset 70, the floor reinforcing member 28 forms a reinforcing module assembly reinforcing the wheel house 50. This allows loads transmitted from the side brace 56, the wheel house connection gusset 70 or the wheel house itself to be transmitted to the rear side frame 22 so as to maximally suppress slant or collapse of the wheel house 50 during a side-impact collision.

Third Embodiment

Figure 28:
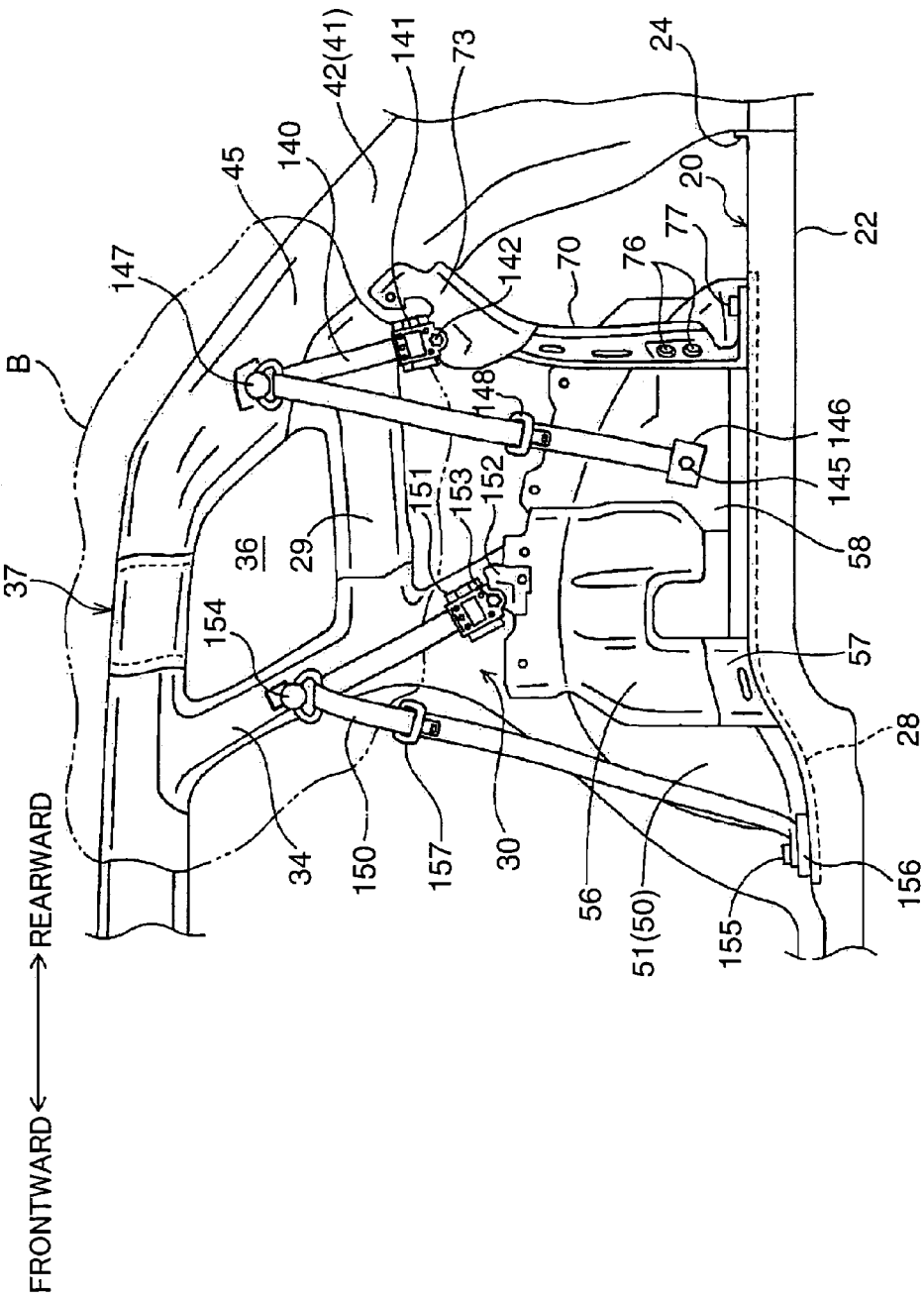
FIG. 28 is an explanatory side view showing a vehicle body structure for a vehicle equipped with a seat belt, according to a third embodiment of the present invention.

FIG. 28 is an explanatory side view showing a vehicle body structure for a vehicle equipped with a seat belt, according to a second embodiment of the present invention. In FIG. 28, an inner panel 31 is partially removed around a rear quarter window opening 36 (area B in FIG. 28).

Referring to FIG. 28, two seat belts 150, 140 for second-row and third-row seats (not shown) are mounted to a body sidewall 30 of a vehicle body 1 to restrain/protect a passenger seated in the seat.

One end of the seat belt 140 for the third-row seat is associated with a seat belt retractor 141 for rewinding and storing the seat belt 140, and the seat belt retractor 141 is fixedly fastened to a bracket member 73 using a fastening bolt 143.

A lower support member 145, such as an anchor plate, is fixed to the other end of the seat belt 140, and mounted to a lower portion of the body sidewall 30. The lower support member 145 is fixedly fastened to a wheel house gusset 58 using a fastening bolt 146 to support the seat belt 140 to the vehicle body. Alternatively, the wheel house gusset 58 may be integrally formed with a side brace 56, and a lower support member 145 for supporting the seat belt 140 to the vehicle body may be fixed to the side brace 56.

The seat belt 140 is also supported by an upper portion of the body sidewall 30 through an upper support member 147, such as a shoulder anchor. The upper support member 147 is fixed to an upper portion of a rear pillar reinforcing member 45. In this manner, the seat belt 140 is mounted to the body sidewall 30 to extend upward from the seat belt retractor 141 and then extend downward to the lower support member 145 through the upper support member 147. A tongue plate 148 is attached to the seat belt 140 at a position below upper support member 147.

One end of the seat belt 150 for the second-row is associated with a seat belt retractor 151. The seat belt retractor 151 is fixedly fastened to a bracket member 152 fixed to the side brace 56, using a fastening bolt 153. The seat belt 150 is supported by the vehicle body through an upper support member 154 fixed to a side pillar reinforcing member 34, and a lower support member 156 fixedly fastened to a floor reinforcing member 28 using a fastening bolt 155. A tongue plate 157 is attached to the seat belt 150 at a position below upper support member 154.

In this manner, the plurality of support members 142, 145, 152, and 156 supporting the seat belts 140, 150 to the vehicle body are mounted to two or more selected from the group consisting of the side pillar reinforcing member 34, the rear pillar reinforcing member 45, the floor reinforcing member 28, the side brace 56, the wheel house connection gusset 70 and a belt line reinforcing member 39, in a decentralized manner. Thus, loads transmitted from the seat belts can be distributedly transmitted to each region of the body sidewall 30 in a wide range to ensure the supporting rigidity for the seat belts.

While the third embodiment is designed such that the seat belt retractor (141, 151) provided at the end of the seat belt (140, 150) is mounted to the vehicle body through the bracket member (73, 153), a support portion may be integrally formed with the seat belt retractor (141, 151), and the seat belt retractor may be mounted to the vehicle body by the support portion. In this case, the same effect of the structure using the bracket member can be obtained.

The wheel house connection gusset 70 in the third embodiment is formed as a single component extending up to the floor reinforcing member 28. As shown in FIG. 28, for fixing the wheel house connection gusset 70, a portion of the wheel house connection gusset 70 adjacent to a lower end thereof is fixedly attached to a rear region of a wheel house 50. Then, the lower end is bent along the floor reinforcing member 28 to extend in the rearward direction of the vehicle body, and joined to the floor reinforcing member 28 using a fastening bolt 77. That is, the second connection member may comprise a wheel house connection gusset 70 prepared by integrally forming the wheel house connection gusset 70 and the floor gusset 80 in the first embodiment.

Fourth Embodiment

A fourth embodiment of the present invention illustrated in FIG. 29 will be described below.

The fourth embodiment illustrated in FIG. 29, a floor gusset 80 is formed by removing a cargo hook from a sub floor gusset 82.

In this embodiment, no cargo is fixed to the sub floor gusset 82, and thereby desired support rigidity of the mounting portion 53 can be stably obtained to reliably obtain stable body rigidity and suspension performance by eliminating loads which otherwise acts thereon due to a cargo fixed thereto.

Fifth Embodiment

Figure 30:
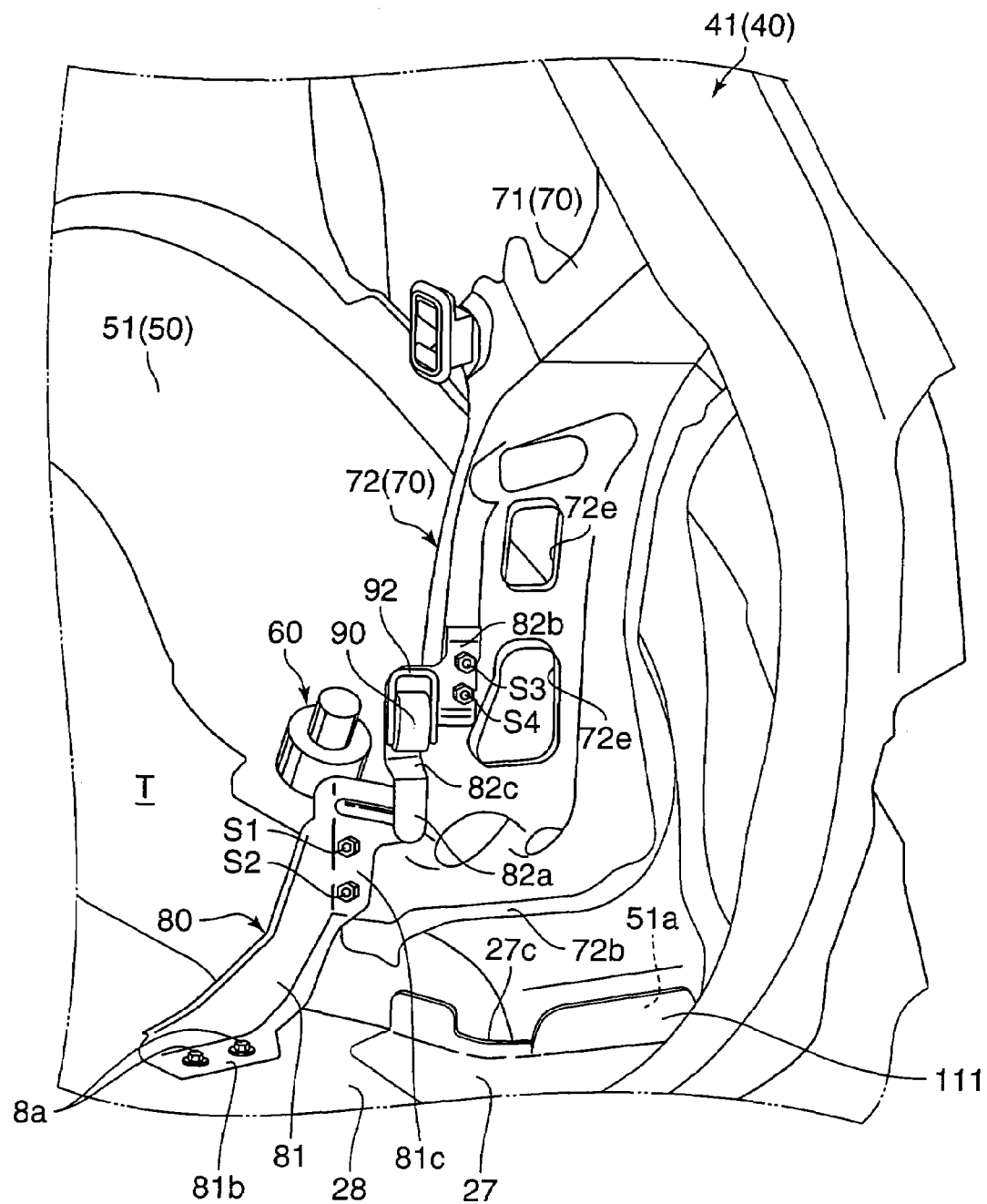
FIG. 30 is a perspective view corresponding to FIG. 8, which shows a fifth embodiment of the present invention.

In a fifth embodiment of the present invention illustrated in FIG. 30, the number of fastening points of a sub floor gusset 82 is increased to two points S3, S4 to enhance fastening strength in the fastening points S3, S4 of the sub floor gusset 82.

In the structure having the floor gusset 80, in view of facilitating an assembling operation, it is necessary to form a horizontally long cutout 95 in the fastening point S3 of the sub floor gusset 82, as shown in FIG. 10, and fastening force would be inevitably lowered.

In contrast, the sub floor gusset 82 having two fastening points S3, S4 as in the fifth embodiment can compensate the lowered rigidity due to the cutout 95, and further the fastening strength in fastening points S3, S4 of the sub floor gusset 82 can be increased to enhance the supporting rigidity for the mounting portion 53.

Sixth Embodiment

Figure 31:
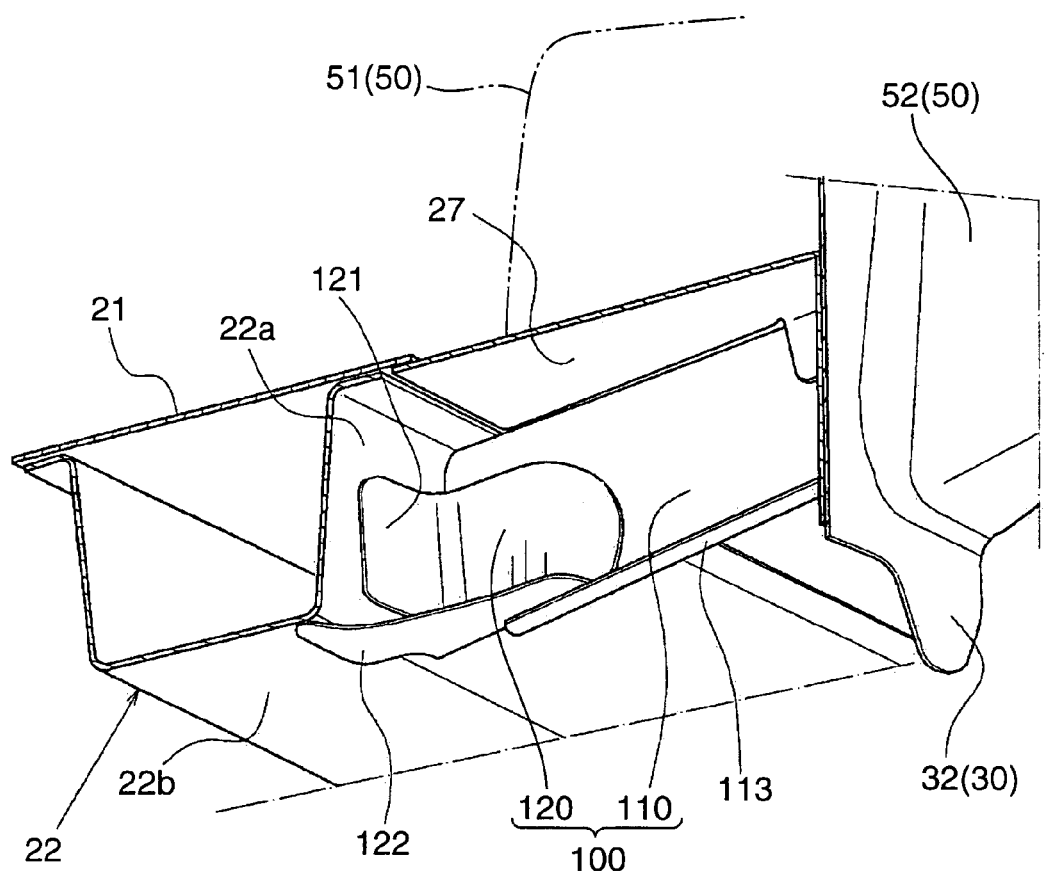
FIG. 31 is a detailed perspective view corresponding to FIG. 19, which shows a sixth embodiment of the present invention.

A sixth embodiment of the present invention will be described below based on FIG. 31.

The sixth embodiment employs a structure where a bracket body 120 of a connection plate 100 is supported at two positions of a frame side-surface junction flange 121 and a frame bottom-surface junction flange 122 which extend toward a rear side frame 22, and omits a junction flange to a side floor panel 27.

The bracket body 120 having the above structure can be readily prepared by a press forming process to allow the connection plate to be provided with enhanced formability. In addition, the need for considering a relationship in junction (position) with the side floor panel 27 can be reduced to facilitate an assembling operation for joining the connection plate.

Other Modifications

While the mounting portion 54 in the above embodiments is used for the rear suspension damper 61, the mounting portion for the rear suspension system 60 in the present invention is not limited thereto, but may be a mounting portion for a suspension link or a coil spring.

Further, while the wheel house connection gusset 70 in the above embodiments is jointed to the rear pillar reinforcing member 45, in the vicinity of the joint portion 46 between the belt line reinforcing member 39 and the rear pillar reinforcing member 45, the wheel house connection gusset 70 may be jointed to the joint portion 46 between the belt line reinforcing member 39 and the rear pillar reinforcing member 45.

The junction portion of the wheel house connection gusset 70 to the wheel house 50 is not limited to a position on the rearward side of the vehicle body 1 as in the above embodiments, but may be any other suitable position which is located frontward of and in a vicinity of the mounting portion 53.

While the wheel house connection gusset 70 and the floor gusset 80 in the above embodiments are jointed by the fastener member, coupling means in the present is not limited to fastening, but may be any other suitable coupling means, such as welding or fitting. Further, preferably, the floor gusset 80 is connected to the wheel house connection gusset 70 at least two fastening points S1, S3 spaced apart from each other in the lateral direction of the vehicle body, in such a manner that the mounting portion 53 for the rear suspension damper 61 is located between the two fastening points S1, S3. Specifically, these two fastening points S1, S3 are deviated from the mounting portion 53 for the rear suspension damper 61 in both the vertical direction and the lateral direction. This allows loads from the rear suspension damper 61 in various directions to be further effectively transmitted to the wheel house connection gusset 70 and the floor gusset 80. In addition, the wheel house connection gusset 70 and the floor gusset 80 can further effectively suppress displacement of the mounting portion 53 to further enhance the support rigidity of the mounting portion 53.

While the fastening points S1, S3—in the first embodiment are set to be spaced apart from each other in both the vertical direction and the lateral direction, they may be set to be spaced apart from each other in only either one of the vertical direction and the lateral direction.

The connection plate 100 in the above embodiments is arranged to extend in the vertical direction. Alternatively, as long as a connection plate arranged to extend in the lateral direction can connect the rear side frame 22 and the body sidewall 30, it may be arranged to extend in a horizontal direction.

While the connection plate 100 in the above embodiments is arranged in the region of the wheel house 50 on the rearward side of the vehicle body, the region is not limited thereto, but may be a region of the wheel house 50 on a frontward side of the vehicle body as long as it is a vicinity of the mounting portion 53.

Further, means for jointing between the connection plate 100 and the lower end of the wheel house inner 51 is not limited to welding as in the above embodiments, but may be any other suitable joint means, such as fastening based on a bolt and nut or fitting.

The connection plate 100 may also be a single component instead of two components. Although such a single member may restrict the shape of the connection plate or the shape of the junction flange due to the formability in manufacturing processes like press forming, this provides an advantage in reducing number of components in a connection plate itself and facilitate reduction in weight.

In summary, a vehicle body structure in accordance with the present invention comprises a body sidewall which forms a side portion of a vehicle body, a wheel house formed on a lower side of the body sidewall and provided with a mounting portion on which a rear suspension system mounts, a side pillar reinforcing member arranged in a side pillar located above the wheel house to extend in a vertical direction of the vehicle body to reinforce the side pillar, a rear pillar reinforcing member arranged in a rear pillar located rearward of the wheel house to extend in the vertical direction of the vehicle body so as to reinforce the rear pillar, a first connection member connecting the side pillar reinforcing member and a lower end of the wheel house, a second connection member connecting the rear pillar reinforcing member and a vicinity of the mounting portion of the wheel house, and a third connection member connecting the side pillar reinforcing member and the rear pillar reinforcing member in a position above the wheel house. According to the present invention, a region of the body sidewall located above the wheel house and rearward thereof can be reinforced to improve torsional rigidity of the body sidewall. In the present invention, "a part of a rear suspension system" includes a damper, a suspension link and a coil spring. Particularly, because the mounting portion is set at a position offset from a bumping portion of a rear wheel, loads apply to the wheel house are supplied not only in the vertical direction but also in the longitudinal and lateral directions of the vehicle body. In the present invention, such input loads in various directions can be further effectively distributed to enhance the supporting rigidity for the mounting portion.

In a preferred embodiment of the present invention, the second connection member is arranged to extend from the wheel house in an upward direction of the vehicle body, and jointed to the rear pillar reinforcing member through a region of the vehicle body including at least a joint portion between the third connection member and the rear pillar reinforcing member. In this embodiment, loads apply to the wheel house via the rear suspension system and others can be transmitted to the rear pillar reinforcing member through the second connection member, so that the loads apply to various regions of the vehicle body can effectively be distributed and improving steering stability.

In a preferred embodiment of the present invention, the second connection member is jointed to the rear pillar reinforcing member at a laterally inward position relative to the joint portion between the third connection member and the rear pillar reinforcing member. In this embodiment, lateral torsional rigidity of the body sidewall can be further improved in a region of the body sidewall located above the wheel house and rearward thereof.

In a preferred embodiment of the present invention, the vehicle body includes a body floor which forms a floor surface of a vehicle interior, and the body floor is at least partly jointed to a rear side frame extending in a longitudinal direction of the vehicle body. Further, the rear pillar reinforcing member is jointed to a rear end of the rear side frame. In this embodiment, the body panel, the rear side frame, the rear pillar reinforcing member, and the second connection member are connected together to form a complex reinforcing module assembly having a triangular shape in side view in a region of the body sidewall located rearward of the wheel house. Thus, the torsional rigidity of the body sidewall further improves.

In a preferred embodiment of the present invention, the vehicle body structure includes a fourth connection member connecting an upper end of the pillar reinforcing member and an upper end of the rear pillar reinforcing member. In this embodiment, in the region of the body sidewall located rearward of the wheel house, the side pillar reinforcing member, the first connection member, the body floor, the second connection member, the rear pillar reinforcing member and the third reinforcing member are connected together in a quadrangular shape, and further the side pillar reinforcing member, the third reinforcing member, the rear pillar reinforcing member and the fourth connection member are connected together in a quadrangular shape. Thus, the above reinforcing members and connection members are connected together to form a shape like a vertically mounted two boxes in side view so as to reinforce the body sidewall to further improve the torsional rigidity of the body sidewall.

In a preferred embodiment of the present invention, the vehicle body structure includes a plurality of support members supporting a seat belt for protection of a passenger, and the support members are mounted to plural portions selected from the side pillar reinforcing member, the rear pillar reinforcing member, the body floor, the first connection member, the second connection member, and the third connection member in a decentralized manner. In this embodiment, the loads transmitted from the seat belt can be distributedly transmitted over various regions of the body sidewall in a wide range to ensure supporting rigidity for the seat belt.

In a preferred embodiment of the present invention, the vehicle body structure includes a body floor which forms a floor surface of a vehicle interior. The wheel house includes a wheel house inner, and the mounting portion is located offset from a top region of the wheel house in a rearward direction of the vehicle body. Further, the second connection member includes a wheel house connection gusset which connects the rear pillar and a portion of the wheel house inner located in a vicinity of the mounting portion, and a floor gusset which is located on a laterally inward side of the vehicle body relative to the mounting portion and below the mounting portion, and joined to the body floor. The floor gusset is connected to the wheel house connection gusset in the vicinity of the mounting portion. According to this embodiment, in the vehicle body structure having the mounting portion for a part of the rear suspension system in a lower portion of the wheel house, input loads from the rear suspension system is distributedly transmitted to the connection gusset and the floor gusset. Thus, even in the vehicle body structure where the mounting portion for a part of the rear suspension system is formed in the lower portion of the wheel house at a position offset from a top region of the wheel house, the input loads can be effectively distributedly transmitted to the body sidewall and the body floor or a body rear wall and the body floor through the connection gusset and the floor gusset to enhance the supporting rigidity for mounting portion.

In a preferred embodiment of the present invention, the floor gusset is connected to the wheel house connection gusset at least two connection points spaced apart from each other in at least either one of the vertical direction and lateral direction of the vehicle body, and the mounting portion is located between the two connection points. In this embodiment, the wheel house connection gusset and the floor gusset are connected together by at least the two connection points spaced apart from each other in the vertical direction or lateral direction. Thus, these gussets are connected together while being located on both sides of the mounting portion, to allow the loads input from the rear suspension system in various directions to be further effectively distributed and transmitted to the wheel house connection gusset and the floor gusset so as to further reliably suppress displacement of the mounting portion based on the wheel house connection gusset and the floor gusset. This makes it possible to further enhance the supporting rigidity for mounting portion based on the wheel house connection gusset and the floor gusset.

In a preferred embodiment of the present invention, the vehicle body structure includes a fastener member provided on the respective connection points to fasten the floor gusset and the wheel house connection gusset together in such a manner as to penetrate therethrough in different directions from each other. In this embodiment, each of the fastener members provided in the connection points is a different penetration direction. This makes it possible to prevent deterioration in fastening force of the wheel house connection gusset and the floor gusset, even if the input loads are applied in a specific direction. Thus, even if the input load acts on the mounting portion, for example, in a torsional direction, the supporting rigidity for mounting portion can be reliably enhanced without deterioration in fastening force of the wheel house connection gusset and the floor gusset.

In a preferred embodiment of the present invention, which further comprises a body floor forming a floor surface of a vehicle interior, the floor gusset includes a main floor gusset connecting the body floor, and a sub floor gusset connecting the main floor gusset and the wheel house connection gusset. In this embodiment, the floor gusset comprises two components of the main floor gusset and the sub floor gusset to allow the gussets to be separately subjected to a press forming process so as to facilitate the forming process. Thus, even when there is the need for preparing plural types of sub floor gussets different in function, or the need for preparing a floor gusset having a complicated shape, such a component can be prepared at lower production cost. In addition, the floor gusset comprising two separate components of the main floor gusset and the sub floor gusset makes it possible to readily change a type of floor gusset, for example, with/without the sub floor gusset, depending on types of vehicles, sales territories of vehicle or the like, and use a common main floor gusset for various types of vehicles.

In a preferred embodiment of the present invention, the vehicle interior includes a cargo compartment, and the sub floor gusset is provided with a cargo hook. In this embodiment, a cargo hook can be set up using the sub floor gusset without a single-purpose bracket for a cargo hook. In addition, the cargo hook is provided in the sub floor gusset as a separatable component from the main floor gusset. Thus, the cargo hook can be arranged at an optimal position for a shape of the cargo compartment without changing the shape of the main floor gusset.

In a preferred embodiment of the present invention, the vehicle body structure includes a floor reinforcing member provided at a lower end of the wheel house and transmits the loads acting on the wheel house to a rear side frame which extends in a longitudinal direction of the vehicle body. The floor gusset is fixed to the floor reinforcing member. In this embodiment, the loads apply to the wheel house can be transmitted to the rear side frame through the floor reinforcing member. Thus, loads apply to the second connection member can be distributed to the rear side frame having higher strength to enhance strength of the body sidewall.

In a preferred embodiment of the present invention, the vehicle body structure includes a floor reinforcing member provided at a lower end of the wheel house and adapted to transmit loads apply to the wheel house to a rear side frame extending in a longitudinal direction of the vehicle body. The sub floor gusset is fixed to the floor reinforcing member. In this embodiment, the loads apply to the wheel house can also be transmitted to the rear side frame through the floor reinforcing member. Thus, the loads apply to the second connection member can be distributed to the rear side frame having higher strength to enhance strength of the body sidewall.

In a preferred embodiment of the present invention, the second connection member is arranged such that an extension direction thereof is equal to a transmit direction of a major load from a part of the rear suspension system. In this embodiment, the second connection member are arranged to stand against an input direction of major loads from the rear suspension system to allow the major input loads from the rear suspension system to be reliably transmitted to the second connection member so as to reliably suppress displacement of the mounting portion. This makes it possible to improve the rigidity of the vehicle body so as to enhance the support rigidity of the mounting portion and improve a steering performance of the vehicle.

In a preferred embodiment of the present invention, the vehicle body structure includes a body floor which forms a floor surface of a vehicle interior, a rear side frame arranged in a bottom surface of the body floor to extend in a longitudinal direction of the vehicle body, and a plate member arranged between the rear side frame and the body sidewall to extend in a lateral direction of the vehicle body so as to connect the rear side frame and the body sidewall. The plate member has a wheel house joint portion jointed to a lower end of the wheel house. In this embodiment, the laterally-extending lower end portion of the wheel house is reinforced by the laterally-extending connection member connecting the rear side frame and the body sidewall. This allows the laterally-extending lower end portion of the wheel house to be fixed to the body sidewall through the plate member so as to obtain high rigidity. In particular, the plate member which fixes the lower end portion on the rearward side of the vehicle body can prevent the occurrence of torsion in a corner of the vehicle body located rearward of the wheel house, to reliably enhance the torsional rigidity of the vehicle body. Further, in the event of a side-impact collision in the vehicle, the laterally-extending plate member which fixes the lower end portion of the wheel house can provide enhanced lateral rigidity to the lower end portion of the wheel house so as to improve side-impact resistance of the vehicle. The plate member is not limited to a specific shape or arrangement (position, posture, etc.), but may have any suitable shape or arrangement as long as it can extend in the lateral direction to connect the rear side frame and the body sidewall. Further, while coupling means between the plate member and the lower end portion of the wheel house is preferably welding, any other suitable coupling means, such as fastening or fitting, may be used.

In a preferred embodiment of the present invention, the wheel house joint portion is located in a vicinity of the mounting portion. In this embodiment, even when the mounting portion for a part of the rear suspension system is formed in a position offset from a top region of the wheel house, for example, a lower end or rearward end of the wheel house, depending on vehicle layout needs or types of rear suspension systems, the laterally-extending plate member reinforcing the lower end of the wheel house allows the input loads apply to the mounting portion from a part of the rear suspension system, to be distributedly transmitted to the side frame and side panel so as to prevent the wheel house from being easily deformed. This makes it possible to prevent deterioration in response of the vehicle body during a steering operation due to deformation of the mounting portion for a part of the rear suspension system.

In a preferred embodiment of the present invention, the plate member includes a frame side-surface junction member joined to a side surface of the rear side frame, and a frame bottom-surface junction member joined to a bottom surface of the rear side frame. In this embodiment, the plate member is jointed to two surfaces, i.e., side and bottom surfaces of the side frame. Thus, while a joint portion between the plate member and the side frame is likely to cause load concentration, joint strength of the joint portion can be enhanced, and loads apply to the plate member can be distributed to the two side and bottom surfaces of the side frame. This makes it possible to further enhance a reinforcing function of the plate member.

In a preferred embodiment of the present invention, the plate member comprises a main plate and a sub bracket. The sub bracket has the frame side-surface junction member and the frame bottom-surface junction member. In this embodiment, the plate member to be jointed to the side and bottom surfaces of the side frames, the side panel and the lower end of the wheel house inevitably has a complicated shape. In this embodiment, the plate member can compose two components to facilitate a press forming process and ensure formability of the plate member. Further, the sub bracket can be joined to the two surface of the side frame to enhance the joint strength between the plate member and the side frame.

In a preferred embodiment of the present invention, the vehicle body structure includes a side floor panel which form an outward part of a floor surface of a vehicle interior. The plate member is jointed to the floor panel. In this embodiment, the plate member is additionally jointed to the side floor panel located rearward of the wheel house. Thus, the plate member can distributedly transmit the input loads to the side floor panel to accelerate enhancement in strength based on the plate member. This makes it possible to further enhance the reinforcing function of the plate member.

In a preferred embodiment of the present invention, the plate member has an edge located on the side of the body sidewall and sandwiched between the side floor panel and the body sidewall. In this embodiment, the edge of the plate member located on the side of the body sidewall is sandwiched between the side floor panel and the body sidewall, and firmly jointed thereto. Thus, while a joint portion between the plate member and the body sidewall is likely to cause load concentration, joint strength of the joint portion can be enhanced to further improve the rigidity of the plate member. This makes it possible to further enhance the reinforcing function of the plate member.

In a preferred embodiment of the present invention, the plate member has a height dimension approximately equal to that of the rear side frame. In this embodiment, the rigidity of the plate member can be maximized while suppressing downward protrusion of the plate member. Further, in the event of a side-impact collision in the vehicle, the plate member is deformed while being evenly in contact with the rear side frame in the vertical direction to reliably ensure a large pressure receiving area so as to effectively absorb impact force based on the side plate.

In a preferred embodiment of the present invention, the vehicle body structure includes a floor reinforcing member provided at a lower end of the wheel house and adapted to transmit loads apply to the wheel house to a rear side frame extending in a longitudinal direction of the vehicle body. In this embodiment, the floor reinforcing member can form a reinforcing module assembly for reinforcing the wheel house, and transmit loads transmitted from the first and second connection members and the wheel house itself, to the rear side frame, to maximally suppress slant or collapse of the wheel house.

In a preferred embodiment of the present invention, the vehicle body structure includes a main floor panel which forms a major part of a floor surface of a vehicle interior, and the floor reinforcing member is formed as a separate component from the main floor panel. In this embodiment, the vehicle body structure can be configured only by changing design parameters of the floor reinforcing member required for having relative high strength. This makes it possible to adequately obtain required strength at lower cost.

In a preferred embodiment of the present invention, the first connection member has a lower portion fixed to the floor reinforcing member. In this embodiment, the floor reinforcing member can form a reinforcing module assembly for reinforcing the wheel house in cooperation with the first connection member. Thus, loads transmitted from the first connection member and the wheel house itself can be further reliably transmitted to the rear side frame to maximally suppress slant or collapse of the wheel house during a side-impact collision.

In a preferred embodiment of the present invention, the second connection member has a lower portion fixed to the floor reinforcing member. In this embodiment, the floor reinforcing member can form a reinforcing module assembly for reinforcing the wheel house in cooperation with the second connection member. Thus, load transmitted from the second connection member and the wheel house itself can be further reliably transmitted to the rear side frame to maximally suppress slant or collapse of the wheel house during a side-impact collision.

In a preferred embodiment of the present invention, each of the first and second connection member has a lower portion fixed to the floor reinforcing member. In this embodiment, the floor reinforcing member can form a reinforcing module assembly for reinforcing the wheel house in cooperation with the first and second connection members. Thus, load transmitted from the first and second connection members and the wheel house itself can be further reliably transmitted to the rear side frame to maximally suppress slant or collapse of the wheel house during a side-impact collision.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

This application is based on Japanese Patent Application Serial Nos. 2005-361876, 2005-372128 and 2006-91002, filed in Japan Patent Office on Dec. 15, 2005, Dec. 26, 2005, and Mar. 29, 2006, respectively the contents of which are hereby incorporated by reference.

What is claimed is:

1. A vehicle body structure comprising:
   a body sidewall which forms a side portion of a vehicle body;
   a wheel house formed on a lower side of said body sidewall and provided with a mounting portion on which a rear suspension system mounts;
   a side pillar reinforcing member arranged in a side pillar located above said wheel house, said side pillar reinforcing member extending in a vertical direction of the vehicle body to reinforce said side pillar;
   a rear pillar reinforcing member arranged in a rear pillar located rearward of said wheel house, said rear pillar reinforcing member extending in the vertical direction of the vehicle body to reinforce said rear pillar;
   a first connection member connecting said side pillar reinforcing member and a lower end of said wheel house;
   a second connection member connecting said rear pillar reinforcing member and a vicinity of said mounting portion of said wheel house; and
   a third connection member connecting said side pillar reinforcing member and said rear pillar reinforcing member, in a position above said wheel house.

2. The vehicle body structure as defined in claim 1, wherein said second connection member is arranged to extend from said wheel house in an upward direction of the vehicle body, and jointed to said rear pillar reinforcing member through a region of the vehicle body including at least a joint portion between said third connection member and said rear pillar reinforcing member.

3. The vehicle body structure as defined in claim 2, wherein said second connection member is jointed to said rear pillar reinforcing member at a laterally inward position relative to the joint portion between said third connection member and said rear pillar reinforcing member.

4. The vehicle body structure as defined in claim 1, further comprising a body floor which forms a floor surface of a vehicle interior, said body floor being at least partly jointed to a rear side frame extending in a longitudinal direction of the vehicle body, wherein said rear pillar reinforcing member is jointed to a rear end of said rear side frame.

5. The vehicle body structure as defined in claim 1, further comprising a fourth connection member connecting an upper end of said pillar reinforcing member and an upper end of said rear pillar reinforcing member.

6. The vehicle body structure as defined in claim 1, further comprising a plurality of support members supporting a seat belt for protection of a passenger, said support members mounted to plural portions selected from said side pillar reinforcing member, said rear pillar reinforcing member, said body floor, said first connection member, said second connection member and said third connection member in a decentralized manner.

7. The vehicle body structure as defined in claim 1, further comprising a body floor which forms a floor surface of a vehicle interior, wherein:
   said wheel house includes a wheel house inner;
   said mounting portion is located offset from a top region of said wheel house in a rearward direction of the vehicle body; and
   said second connection member includes a wheel house connection gusset which connects said rear pillar and a portion of said wheel house inner located in a vicinity of said mounting portion, and a floor gusset which is located on a laterally inward side of the vehicle body relative to said mounting portion and below said mounting portion, and joined to said body floor, wherein said floor gusset is connected to said wheel house connection gusset in the vicinity of said mounting portion.

8. The vehicle body structure as defined in claim 7, wherein:
said floor gusset is connected to said wheel house connection gusset at least two connection points spaced apart from each other in at least either one of the vertical direction and lateral direction of the vehicle body; and
said mounting portion is located between said two connection points.

9. The vehicle body structure as defined in claim 8, further comprising a fastener member provided on the respective connection points to fasten said floor gusset and said wheel house connection gusset together in such a manner as to penetrate therethrough in different directions from each other.

10. The vehicle body structure as defined in claim 8, further comprising a body floor which forms a floor surface of a vehicle interior, wherein said floor gusset includes:
a main floor gusset connecting said body floor; and
a sub floor gusset connecting said main floor gusset and said wheel house connection gusset.

11. The vehicle body structure as defined in claim 10, wherein said vehicle interior includes a cargo compartment and said sub floor gusset is provided with a cargo hook.

12. The vehicle body structure as defined in claim 7, further comprising a floor reinforcing member provided at a lower end of said wheel house and adapted to transmit load applied to said wheel house, to a rear side frame extending in a longitudinal direction of the vehicle body, wherein said floor gusset is fixed to said floor reinforcing member.

13. The vehicle body structure as defined in claim 10, further comprising a floor reinforcing member provided at a lower end of said wheel house and transmits loads from said wheel house to a rear side frame which extends in a longitudinal direction of the vehicle body, wherein said sub floor gusset is fixed to said floor reinforcing member.

14. The vehicle body structure as defined in claim 1, wherein said second connection member is arranged such that an extension direction thereof is equal to a transmit direction of a major load from a part of said rear suspension system.

15. The vehicle body structure as defined in claim 1, further comprising:
a body floor which forms a floor surface of a vehicle interior;
a rear side frame arranged in a bottom surface of said body floor to extend in a longitudinal direction of the vehicle body; and
a plate member arranged between said rear side frame and said body sidewall to extend in a lateral direction of the vehicle body so as to connect said rear side frame and said body sidewall, said plate member having a wheel house joint portion jointed to a lower end of said wheel house.

16. The vehicle body structure as defined in claim 15, wherein said wheel house joint portion is located in a vicinity of said mounting portion.

17. The vehicle body structure as defined in claim 15, wherein said plate member includes:
a frame side-surface junction member joined to a side surface of said rear side frame; and
a frame bottom-surface junction member joined to a bottom surface of said rear side frame.

18. The vehicle body structure as defined in claim 17, wherein said plate member comprises a main plate and a sub bracket, said sub bracket having said frame side-surface junction member and said frame bottom-surface junction member.

19. The vehicle body structure as defined in claim 15, further comprising a side floor panel which form an outward part of a floor surface of a vehicle interior, wherein said plate member is jointed to said floor panel.

20. The vehicle body structure as defined in claim 19, wherein said plate member has an edge located on the side of said body sidewall and sandwiched between said side floor panel and said body sidewall.

21. The vehicle body structure as defined in claim 15, wherein said plate member has a height dimension approximately equal to that of said rear side frame.

22. The vehicle body structure as defined in claim 1, further comprising a floor reinforcing member provided at a lower end of said wheel house and adapted to transmit a load to which said wheel house is subjected to a rear side frame extending in a longitudinal direction of the vehicle body.

23. The vehicle body structure as defined in claim 22, further comprising a main floor panel which forms a major part of a floor surface of a vehicle interior, wherein said floor reinforcing member is formed as a separate component from said main floor panel.

24. The vehicle body structure as defined in claim 22, wherein said first connection member has a lower portion fixed to said floor reinforcing member.

25. The vehicle body structure as defined in claim 22, wherein said second connection member has a lower portion fixed to said floor reinforcing member.

26. The vehicle body structure as defined in claim 22, wherein each of said first and second connection member has a lower portion fixed to said floor reinforcing member.

* * * * *